(12) United States Patent
Malas et al.

(10) Patent No.: US 11,943,004 B1
(45) Date of Patent: *Mar. 26, 2024

(54) SYSTEMS AND METHODS FOR EXTENDING WIRELINE COMMUNICATION NETWORKS

(71) Applicant: Cable Television Laboratories, Inc., Louisville, CO (US)

(72) Inventors: Daryl William Malas, Broomfield, CO (US); George J. Kakatsakis, Boulder, CO (US); Belal Hamzeh, Westminster, CO (US); Luis Alberto Campos, Superior, CO (US); Eric Winkelman, Boulder, CO (US); Mario Di Dio, Longmont, CO (US); Luther E. Smith, Fort Lupton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,630

(22) Filed: Jul. 4, 2022

Related U.S. Application Data

(63) Continuation of application No. 17/119,833, filed on Dec. 11, 2020, now Pat. No. 11,381,278.

(60) Provisional application No. 63/090,470, filed on Oct. 12, 2020, provisional application No. 63/081,663, filed on Sep. 22, 2020, provisional application No. 63/048,836, filed on Jul. 7, 2020, provisional application No. 63/048,838, filed on Jul. 7, 2020, provisional application No. 62/951,764, filed on Dec. 20, 2019, provisional application No. 62/946,854, filed on Dec. 11, 2019.

(51) Int. Cl.
*H04B 3/02* (2006.01)
*H04B 10/2575* (2013.01)

(52) U.S. Cl.
CPC ......... *H04B 3/02* (2013.01); *H04B 10/25752* (2013.01)

(58) Field of Classification Search
CPC ............................ H04B 3/02; H04B 10/25752
USPC ................................................... 375/211, 257
See application file for complete search history.

(56) References Cited

U.S. PATENT DOCUMENTS

| | | | |
|---|---|---|---|
| 2007/0121573 A1* | 5/2007 | Zuckerman | H04W 92/02 370/350 |
| 2007/0188345 A1 | 8/2007 | Yu | |

(Continued)

*Primary Examiner* — Don N Vo
(74) *Attorney, Agent, or Firm* — PdZ Patent Law, PLLC

(57) ABSTRACT

A method for operating a wireline communication device on a wireless communication network includes (a) receiving a downlink radio frequency (RF) electrical signal at a first connector, (b) converting the downlink RF electrical signal to a downlink access signal having a format that is compatible with the wireline communication device, and (c) providing the downlink access signal to a second connector for transporting to the wireline communication device. A method for extending a wireline communication network includes (a) receiving a downlink wireline signal at a node of the wireline communication network, (b) converting the downlink wireline signal to a downlink RF electrical signal, and (c) converting the downlink RF electrical signal to a downlink wireless signal, for transmission to one or more communication devices which are not physically connected to the wireline communication network.

19 Claims, 18 Drawing Sheets

(56) References Cited

U.S. PATENT DOCUMENTS

| | | |
|---|---|---|
| 2008/0260389 A1 | 10/2008 | Zheng |
| 2011/0268446 A1* | 11/2011 | Cune .................. H04J 14/0298 |
| | | 398/115 |
| 2011/0268452 A1* | 11/2011 | Beamon ............... H04W 72/23 |
| | | 398/116 |
| 2013/0004176 A1* | 1/2013 | Sato ................. H04B 10/25754 |
| | | 398/96 |
| 2013/0294462 A1 | 11/2013 | Chang et al. |
| 2016/0037231 A1 | 2/2016 | Mackenzie et al. |
| 2017/0078064 A1 | 3/2017 | Gerszberg et al. |
| 2018/0145750 A1* | 5/2018 | Chamarti ............... H04B 10/25 |
| 2018/0262363 A1* | 9/2018 | Chamberlain .......... H04L 12/10 |
| 2019/0045534 A1 | 2/2019 | Zaks et al. |

\* cited by examiner

SYSTEMS AND METHODS FOR EXTENDING WIRELINE COMMUNICATION NETWORKS

RELATED APPLICATIONS

This application is a continuation of U.S. patent application Ser. No. 17/119,833, filed on Dec. 11, 2020, which claims benefit of priority to each of the following United States Provisional Patent Applications: (a) U.S. Provisional Patent Application No. 62/946,854, filed on Dec. 11, 2019, (b) U.S. Provisional Patent Application No. 62/951,764, filed on Dec. 20, 2019, (c) U.S. Provisional Patent Application No. 63/048,836, filed on Jul. 7, 2020, (d) U.S. Provisional Patent Application No. 63/048,838, filed on Jul. 7, 2020, (e) U.S. Provisional Patent Application No. 63/081,663, filed on Sep. 22, 2020, and (f) U.S. Provisional Patent Application No. 63/090,470, filed on Oct. 12, 2020. Each of the aforementioned patent applications is incorporated herein by reference.

BACKGROUND

Urban and suburban areas typically have access to high-performance wireline communication networks. For example, cable wireline communication networks, which are widely available in urban and suburban areas, are frequently capable of transmitting downlink data to end users at a bandwidth of up to 1 gigabit per second (GBs), and the next generation of cable wireline communication networks will support bandwidths of up 10 GBs. However, rural areas often have access to solely conventional telephone networks, sometimes referred to as "plain old telephone service" (POTS) networks. Conventional telephone networks are generally not well-suited for providing broadband communication service in rural areas due to their inability to carry high-bandwidth data over a long distance. While cable and other high-performance wireline networks can be expanded to rural areas, such expansion may not be economically feasible due to the high cost of providing wireline coverage to sparsely populated areas.

Additionally, geographic features may limit reach of a wireline communication network. For example, a mountain, canyon, river, or lake may block expansion of a wireline communication network. As another example, it may be impractical for a wireline communication network to cross a highway to reach a potential customer on the other side of the highway.

Conventional fixed wireless communication networks have been developed to provide broadband communication service to rural areas. These communication networks usually include a directional antenna configured to transmit wireless signals toward a rural area, as well as a receiving antenna placed on a tall structure adjacent a customer. Fixed wireless communication networks often operate in a 3.5 gigahertz (GHz) band, an industrial, scientific, and medical (ISM) band (e.g., 5 GHz), or a television white space (TVWS) band. While conventional fixed wireless communication networks may provide acceptable service, they typically require proprietary and expensive equipment, both at the service provider's central network node and at the customer's premises. Additionally, installation of customer premises equipment (CPE) frequently requires special skills, which necessitates a truck roll to the installation site.

DETAILED DESCRIPTION OF THE EMBODIMENTS

Disclosed herein are systems and methods for extending a wireline communication network. The new systems and methods may be used, for example, to provide broadband and other information services to rural areas, or to overcome geographic obstacles to conventional wireline communication network extension. While the new systems and methods use wireless transmission, they may significantly leverage conventional hardware and data transmission protocols. For example, some embodiments allow use of a conventional modem or optical network terminal (ONT) at a customer's premises, thereby promoting low cost, ease of component procurement, ease of supply chain management, ease of system support, and ease of installation. As another example, certain embodiments support one or more conventional wireline communication protocols, such as a cable communication protocol, an optical communication protocol, or a digital subscriber line communication protocol, thereby promoting ease of integration into an existing wireline communication network. Furthermore, some embodiments are compatible with conventional wireline communication nodes, or require only minor modifications to existing wireline communication nodes, thereby further promoting low cost, ease of component procurement, ease of system support, and ease of deployment. Additionally, some embodiments can operate with a simple and low-cost wireline communication node. Moreover, some embodiments do not require modifications to a network core or other central element of the wireline communication network. Accordingly, the new systems and methods advantageously facilitate deployment of broadband communication services and/or other information services to underserved areas at a lower cost than conventional approaches.

Figure 1:
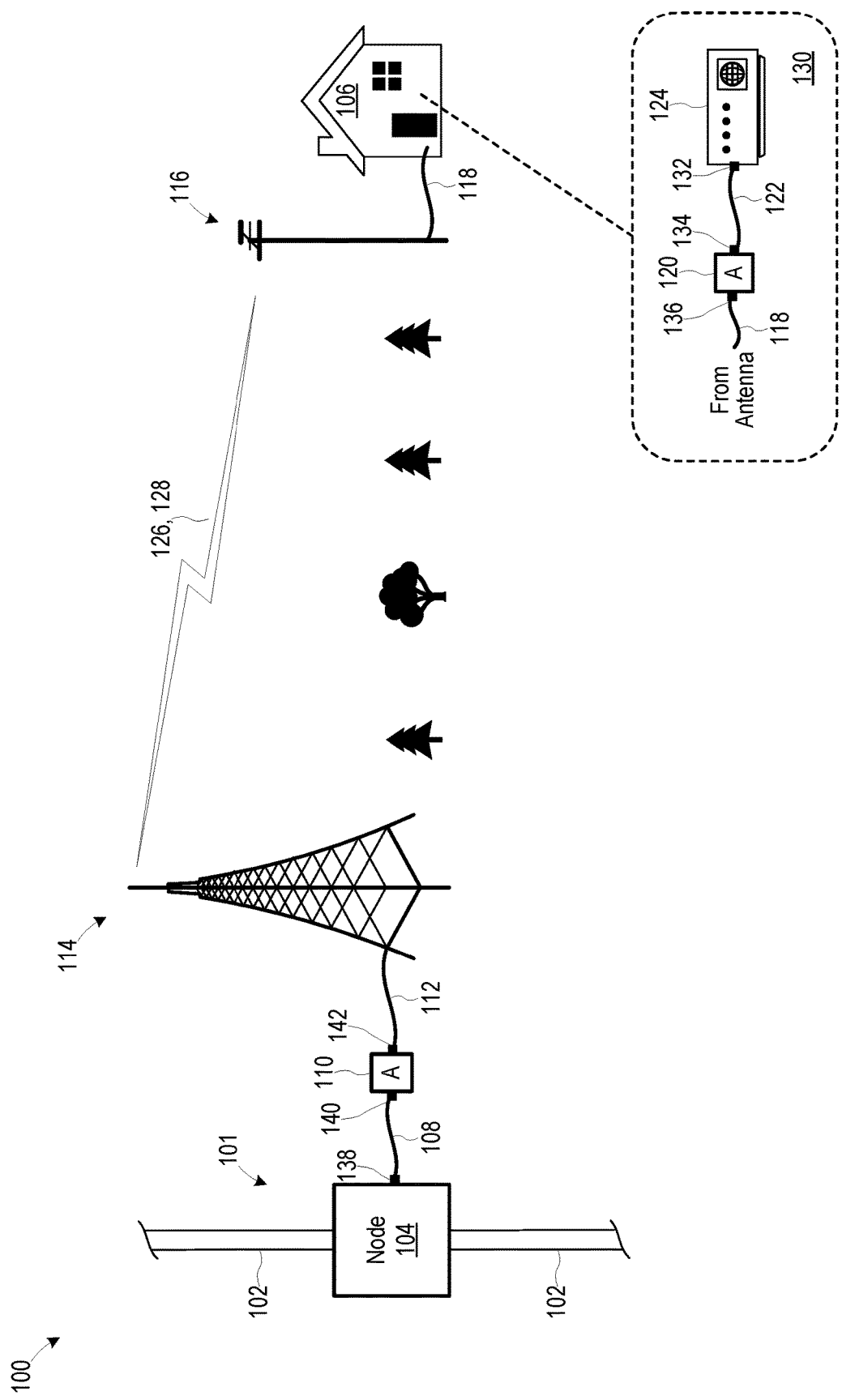
FIG. 1 is a block diagram of a system for extending a wireline communication network, according to an embodiment.

FIG. 1 is a block diagram of a system 100 for extending a wireline communication network, which is one embodiment of the new systems disclosed herein. System 100 extends reach of an existing wireline communication network 101, which is depicted by a wireline cable 102 and a wireline communication node 104, to a customer premises 106, e.g. a residence or a business, that is remote from wireline communication node 104. System 100 is configured, for example, to provide Internet service, video service, voice service, and/or other data services to customer premise 106 from wireline communication network 101.

Wireline cable 102 is, for example, an optical cable or an electrical cable (e.g., a coaxial electrical cable or a twisted pair electrical cable). Wireline cable 102 may be an existing cable in a wireline communication network, such as an existing cable connecting respective infrastructure at two different locations. Alternately, wireline cable 102 may be newly installed to support system 100. In some embodiments, data is transmitted over wireline cable 102 according to a cable protocol (e.g., a Data Over Cable Service Interface Specification (DOCSIS) protocol), an optical protocol (e.g., an Ethernet passive optical network (EPON) protocol, a radio frequency over glass (RFOG) protocol, or a gigabit passive optical network (GPON) protocol), a digital subscriber line (DSL) protocol or another telecommunications protocol (e.g. a T-carrier or E-carrier protocol), an Internet protocol, or variations, extensions, or successors of any of the foregoing. While not required, wireline communication network 101 will typically include additional elements, such as a network core or other central element, that are not shown in FIG. 1 for illustrative clarity.

System 100 further includes an access cable 108, an antenna adapter 110, an antenna cable 112, a service provider antenna 114, a customer antenna 116, an antenna cable 118, an antenna adapter 120, an access cable 122, and a wireline communication device 124. Any of access cable 108, antenna cable 112, antenna cable 118, and access cable 122 could be replaced with an alternative communication medium, such as an electrical or optical conductor on a printed circuit board (PCB) or an electrical or optical conductor within an integrated circuit. For example, communication node 104 and antenna adapter 110 could be disposed on a common PCB and communicatively coupled via one or more PCB conductors in place of access cable 108. As another example, communication node 104, antenna adapter 110, and service provider antenna 114 could be mounted on a common PCB and communicatively coupled by PCB conductors in place of access cable 108 and antenna cable 112.

Communication node 104 is configured to interface wireline cable 102 with access cable 108. Specifically, communication node 104 is configured to (a) convert downlink wireline signals on wireline cable 102 to downlink access signals on access cable 108, and (b) convert uplink access signals on access cable 108 to uplink wireline signals on wireline cable 102. In some embodiments, access cable 108 is either an electrical cable or an optical cable. Discussed below are several example configurations of communication node 104. It is appreciated, however, that communication node 104 is not limited to these examples; instead, communication node 104 could have other configurations as long as it is capable of interfacing wireline cable 102 with access cable 108.

In some embodiments, communication node 104 is a cable system fiber node, wireline cable 102 is an optical cable, and access cable 108 is a coaxial electrical cable or an optical cable. In these embodiments, downlink and uplink access signals on access cable 108 comply with a cable communication protocol, such as a DOC SIS protocol. Downlink and uplink wireline signals on wireline cable 102 may also comply with the cable communication protocol, or the wireline signals may comply with an alternative communication protocol. In the later case, communication node 104 is configured to translate between the alternative communication protocol and the cable communication protocol.

In some other embodiments, communication node 104 is an optical line terminal (OLT), wireline cable 102 is an electrical or optical cable, and access cable 108 is an optical cable. In certain of these embodiments, downlink and uplink access signals on access cable 108 comply with an EPON protocol, a RFOG protocol, a GPON protocol, or extensions, variations, or successors of any of these communication protocols. Uplink and downlink signals on wireline cable 102 comply, for example, with an Ethernet communication protocol.

In some other embodiments, communication node 104 is a digital subscriber line access multiplexer (DSLAM), wireline cable 102 is an electrical or optical cable, and access cable 108 is a twisted pair electrical cable. In certain of these embodiments, downlink and uplink access signals on access cable 108 comply with a DSL protocol. Uplink and downlink signals on wireline cable 102 comply, for example, with a telecommunications protocol or an Ethernet communication protocol.

Antenna adapter 110 enables service provider antenna 114 to operate with communication node 104. Specifically, antenna adapter 110 is configured to interface access cable 108 and antenna cable 112 by converting between access signals on access cable 108 and RF electrical signals on antenna cable 112. In particular, antenna adapter 110 is configured to (a) convert downlink access signals on access cable 108 to downlink RF electrical signals on antenna cable 112, and (b) convert uplink RF electrical signals on antenna cable 112 to uplink access signals on access cable 108. In some embodiments, antenna adapter 110 is not configured to perform communication protocol translation, such that access signals on access cable 108 comply with the same communication protocol as RF electrical signals on antenna cable 112. For example, in certain embodiments, antenna adapter 110 is configured to perform amplification and impedance matching between communication node 104 and service provider antenna 114 without performing communication protocol translation, thereby promoting low cost of antenna adapter 110 and low data transmission latency in system 100.

While communication node 104 and antenna adapter 110 are depicted in FIG. 1 as being separate elements, these two elements could be combined such that access cable 108 is not required. For example, communication node 104 and antenna adapter 110 could be combined into a commonly assembly which converts between the wireline domain and the RF electrical domain, i.e. a common assembly configured to (a) convert downlink wireline signals on wireline cable 102 to downlink RF electrical signals on antenna cable 112 and (b) convert uplink RF electrical signals on antenna cable 112 to uplink wireline signals on wireline cable 102. For example, in particular embodiments, communication node 104 and antenna adapter 110 are combined into a common assembly which is configured to operate as a remote physical layer (PHY) device or a remote media access control layer-physical layer (MAC-PHY) device. The common assembly could be configured to operate solely in the digital domain or solely the analog domain. For example, in some embodiments, the common assembly is configured to convert wireline signals in digital form to RF electrical signals in digital form, and vice versa. Alternately, the common assembly could be configured to convert between the digital domain and the analog domain. For example, in some embodiments, the common assembly is configured to convert wireline signals in digital form to RF electrical signals in analog form, and vice versa. Several example configurations of communication node 104 and antenna adapter 110 being combined into a common assembly are discussed below with respect to FIGS. 5-7.

In some embodiments where antenna adapter 110 and communication node 104 are separate elements, communication node 104 includes a connector 138 for physically connecting to access cable 108. Connector 138 is, for example, a coaxial electrical cable connector, a telephone cable connector, an optical cable connector, or an Ethernet cable connector. Some embodiments of antenna adapter 110 include a connector 140 capable of physically connecting to connector 138 and/or to access cable 108. Additionally, some embodiments of antenna adapter 110 include a connector 142 capable of connecting to antenna cable 112. Connector 140 is, for example, a coaxial electrical cable connector, a telephone cable connector, an optical cable connector, or an Ethernet cable connector. Connector 142 is, for example, a coaxial electrical cable connector. In some embodiments including connectors 138 and 140, the two connectors can by physically connected to together, such that access cable 108 is embodied by connectors 138 and 140 instead of an element separate from connectors 138 and 140.

Service provider antenna 114 is configured to wirelessly link wireline communication system 101 with one or more customer antennas 116. Specifically, service provider antenna 114 is configured to (a) convert downlink RF electrical signals on antenna cable 112 to downlink wireless signals 126, and (b) convert uplink wireless signals 128 from customer antenna 116 to uplink RF electrical signals on antenna cable 112. Service provider antenna 114 could be implemented by respective uplink and downlink antennas (not shown in FIG. 1) instead of a single antenna. Downlink wireless signals 126 and uplink wireless signals 128 could be in either analog form or digital form.

In some embodiments, uplink and/or downlink wireless signals 126 and 128 are within one or more of the 3.5 GHz band, the ISM band, and the TVWS band. Furthermore, in certain embodiments, downlink and uplink wireless signals 126 and 128 have the same respective frequencies as downlink and uplink access signals on access cable 108, such that antenna adapter 110 need not be capable of performing frequency shifting. In some other embodiments, though, antenna adapter 110 is configured to shift frequency of one or more of downlink and uplink signals when converting between access signals on access cable 108 and RF electrical signals on antenna cable 112.

Customer antenna 116 is configured to wirelessly link customer premises 106 with wireline communication system 101. Specifically, customer antenna 116 is configured to (a) convert downlink wireless signals 126 to downlink RF electrical signals on antenna cable 118, and (b) convert uplink RF electrical signals on antenna cable 118 to uplink wireless signals 128. Customer antenna 116 is, for example, mounted on a tall structure adjacent customer premises 106 or on customer premises 106 itself. In particular embodiments, customer antenna 116 is capable operating in the 5 to 800 megahertz (MHz) range and has a gain of 6 decibels relative to isotrope (dBi). Customer antenna 116 could be implemented by respective uplink and downlink antennas (not shown in FIG. 1) instead of a single antenna.

Box 130 in FIG. 1 illustrates elements of system 100 within customer premises 106. In the FIG. 1 embodiment, antenna adapter 120, access cable 122, and wireline communication device 124 are located in customer premises 106, and antenna cable 118 communicatively couples customer antenna 116 and antenna adapter 120. However, one or all of the elements illustrated in FIG. 1 as being within customer premises 106 could alternatively be located outside of customer premises 106, such as on a structure supporting customer antenna 116, in a ground-mounted enclosure or a pole-mounted enclosure, or on the exterior of customer premises 106.

Antenna adapter 120 enables wireline communication device 124 to operate with customer antenna 116 by interfacing antenna cable 118 with access cable 122. In particular, antenna adapter 120 is configured to (a) convert downlink RF electrical signals on antenna cable 118 to downlink access signals on access cable 122 and (b) convert uplink access signals on access cable 122 to uplink RF electrical signals on antenna cable 118. The downlink access signals have a format that is compatible with wireline communication device 124, and the uplink RF electrical signals optionally have a format that is compatible with wireline communication network 101. In some embodiments, antenna adapter 120 is not configured to perform communication protocol translation, such that access signals on access cable 122 comply with the same communication protocol as RF electrical signals on antenna cable 118. For example, in certain embodiments, antenna adapter 120 is configured to perform amplification and impedance matching between wireline communication device 124 and customer antenna 116 without perform communication protocol translation, thereby promoting low cost of antenna adapter 120 and low data transmission latency in system 100. Additionally, in some embodiments, frequency of access signals on access cable 122 is the same as frequency of wireless signals 126 and 128, such that antenna adapter 120 need not be cable of performing frequency shifting. In some other embodiments, antenna adapter 120 is configured to shift frequency of uplink signals and/or downlink signals. In certain embodiments, antenna adapter 120 is combined with wireline communication device 124, such that access cable 122 is not required. Several example configurations of antenna adapter 120 are discussed below with respect to FIGS. 11-15.

Wireline communication device 124 may be any device that is configured to physically connect to wireline communication network 101. For example, wireline communication device 124 may be a modem, such as a cable modem operating according to a cable communication protocol (e.g. a DOCSIS communication protocol) or a DSL modem operating according to a DSL protocol. As another example, wireline communication device 124 may be an optical network terminal (ONT) or an optical network unit (ONU) operating according to an optical communication protocol (e.g., a GPON communication protocol, an EPON communication protocol, or a RFOG communication protocol. Additionally, wireline communication device 124 may be a set-top box (STB), a premises gateway, or a digital-to-analog (DTA) and embedded multimedia terminal adapter (EMTA). Additionally, wireline communication device 124 could be a wireless access base station, including but not limited to a long-term evolution (LTE) wireless base station, a fifth generation (5G) new radio (NR) wireless base station, a sixth generation (6G) wireless base station, an unlicensed radio spectrum wireless base station (e.g. a Wi-Fi or unlicensed NR), or extensions and/or variations thereof. Wireline communication device 124 could be another type of device without departing from the scope hereof.

Some embodiments of wireline communication device 124 include a connector 132 for physically connecting to access cable 122. Connector 132 is, for example, a coaxial electrical cable connector, a telephone cable connector, an optical cable connector, or an Ethernet cable connector. Some embodiments of antenna adapter 120 include a connector 134 capable of physically connecting to connector 132 and/or to access cable 122. Additionally, some embodiments of antenna adapter 120 include a connector 136 capable of connecting to antenna cable 118. Connector 134 is, for example, a coaxial electrical cable connector, a telephone cable connector, an optical cable connector, or an Ethernet cable connector. Connector 136 is, for example, a coaxial electrical cable connector. Antenna adapter 120 delivers downlink access signals to connector 134 for transporting to wireline communication device 124, and adapter 120 receives uplink access signals from wireline communication device 124 via connector 134. In some embodiments including connectors 132 and 134, the two connectors can by physically connected to together, such that access cable 122 is embodied by connectors 132 and 134 instead of an element separate from connectors 132 and 134.

Frequency shifting by antenna adapters 110 and 120 may be required when downlink and/or uplink wireless signals 126 and 128 must be within a different frequency band than corresponding access signals. Additionally, frequency shifting can be used to increase data transmission capacity of system 100. For example, in applications where system 100 serves multiple customer premises 106, each customer premises 106 could be configured to operate in a different frequency band to help maximize system 100's capacity. Frequency shifting by antenna adapters 110 and 120 may be required to enable the respective frequency bands associated with each customer premises 106 to be wirelessly transmitted between service provider antenna 114 and customer antenna 116, such as due to wireless spectrum constraints in the geographic operating area of system 100. For example, frequency shifting may be employed to map a shared frequency band of downlink wireless signals 126 to RF electrical signals in different respective frequency bands for each customer premises 106.

Figure 2:
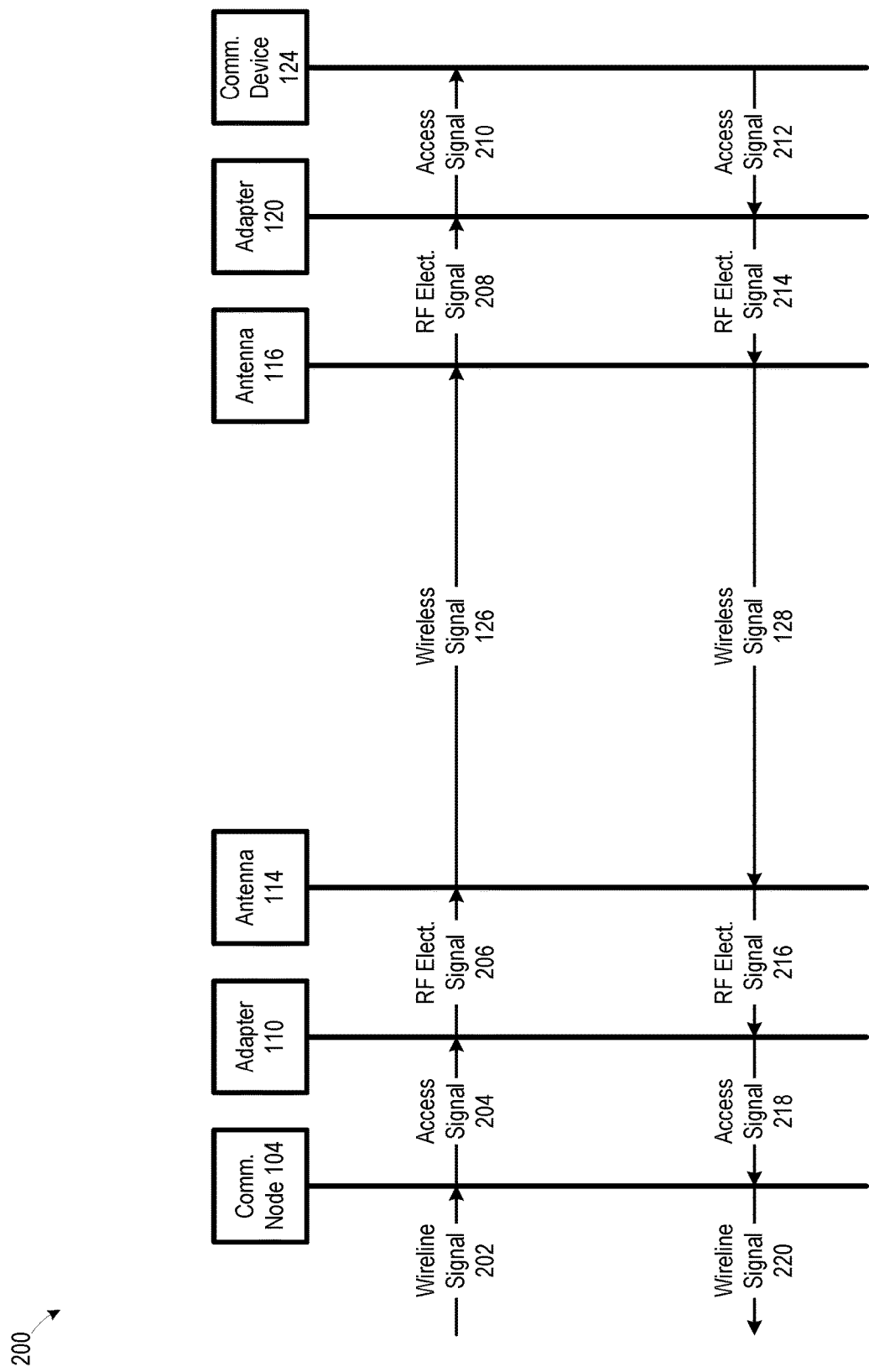
FIG. 2 is a dataflow diagram illustrating one example of operation of the FIG. 1 system.

FIG. 2 is a dataflow diagram 200 illustrating one example of operation of system 100. Diagram 200 includes vertical lines logically representing each of communication node 104, antenna adapter 110, service provider antenna 114, customer antenna 116, antenna adapter 120, and wireline communication device 124. In this example, communication node 104 receives a downlink wireline signal 202 from wireline cable 102 (not shown in FIG. 2), where information carried by wireline signal 202 is destined for wireline communication device 124. Communication node 104 converts downlink wireline signal 202 to downlink access signal 204, and access cable 108 transports downlink access signal 204 from communication node 104 to antenna adapter 110. Antenna adapter 110 converts downlink access signal 204 to downlink RF electrical signal 206, and antenna cable 112 transports downlink RF electrical signal 206 from antenna adapter 110 to service provider antenna 114. Service provider antenna 114 converts RF electrical signal 206 to downlink wireless signal 126, and customer antenna 116 receives downlink wireless signal 126. Customer antenna 116 converts downlink wireless signal 126 into downlink RF electrical signal 208, and antenna cable 118 transports downlink RF electrical signal 208 from customer antenna 116 to antenna adapter 120. Antenna adapter 120 converts downlink RF electrical signal 208 to downlink access signal 210, and access cable 122 transports downlink access signal 210 from antenna adapter 120 to wireline communication device 124. Downlink access signal 210, which has a format that is compatible with wireline communication device 124, includes the information carried by downlink wireline signal 202 that is destined for wireline communication device 124.

Diagram 200 also includes an example of uplink transmission. Specifically, wireline communication device 124 provides uplink access signal 212 to access cable 122, where uplink access signal 212 carries information destined for wireline communication network 101. Access cable 122 transports uplink access signal 212 to antenna adapter 120, and antenna adapter 120 converts uplink access signal 212 into uplink RF electrical signal 214. Antenna cable 118 transports uplink RF electrical signal 214 from antenna adapter 120 to customer antenna 116, and customer antenna 116 converts uplink RF electrical signal 214 to uplink wireless signal 128. Service provider antenna 114 receives uplink wireless signal 128, and service provider antenna 114 converts uplink wireless signal 128 to uplink RF electrical signal 216. Antenna cable 112 transports uplink RF electrical signal 216 from service provider antenna 114 to antenna adapter 110, and antenna adapter 110 converts uplink RF electrical signal 216 to uplink access signal 218. Access cable 108 transports uplink access signal 218 to communication node 104, and communication node 104 converts uplink access signal 218 to uplink wireline signal 220, for transporting by wireline cable 102. Uplink wireline signal 220, which has a format that is compatible with wireline communication network 101, includes the information carried by uplink access signal 212 that is destined for wireline communication network 101. In some embodiments, uplink wireline signal 220 and uplink RF electrical signal 216 comply with a common communication protocol, such that antenna adapter 110 does not need to perform communication protocol translation. Although FIG. 2 illustrates downlink and uplink transmission occurring at different times, some embodiments of system 100 support simultaneous downlink and uplink transmission.

Referring again to FIG. 1, in some embodiments, access signals on access cable 122 comply with the same communication protocol as access signals on access cable 108. In these embodiments, wireline communication device 124 may therefore be a standard communication device intended to operate on wireline network 101, instead of communication device specifically designed to operate with system 100. Such potential standardization of wireline communication device 124 promotes low cost of wireline communication device 124, ease of procuring wireline communication device 124, ease of installation of wireline communication device 124, and ease of support of wireline communication device 124. In conventional fixed wireless communication systems, in contrast, customer premises equipment is typically proprietary equipment, as discussed above.

Additionally, in certain embodiments, antenna adapter 110 handles any required conversion of signals between communication node 104 and service provider antenna 114, thereby enabling communication node 104 to be a standard communication node, i.e. a communication node that is not specially designed for use with system 100. The ability of communication node 104 to be a standard device further promotes low cost, ease of procuring node 104, ease of installation of node 104, and ease of support of node 104. Alternately, communication node 104 could be specially designed for use in system 100, thereby potentially enabling communication node 104 to be simpler and cheaper than a conventional communication node. Additionally, in some embodiments, no changes are needed to a network core or other central element of wireline communication network 101 to support system 100. Indeed, in particular embodiments, the network core/central element may not even be able to detect that wireline communication device 124 is connected to wireline communication network 101 via system 100, instead of being directly physically connected to wireline communication network 101. Conventional fixed wireless communication systems, in contrast, typically require dedicated central equipment, such as a cellular network core, to support wireless customers.

Figure 3:
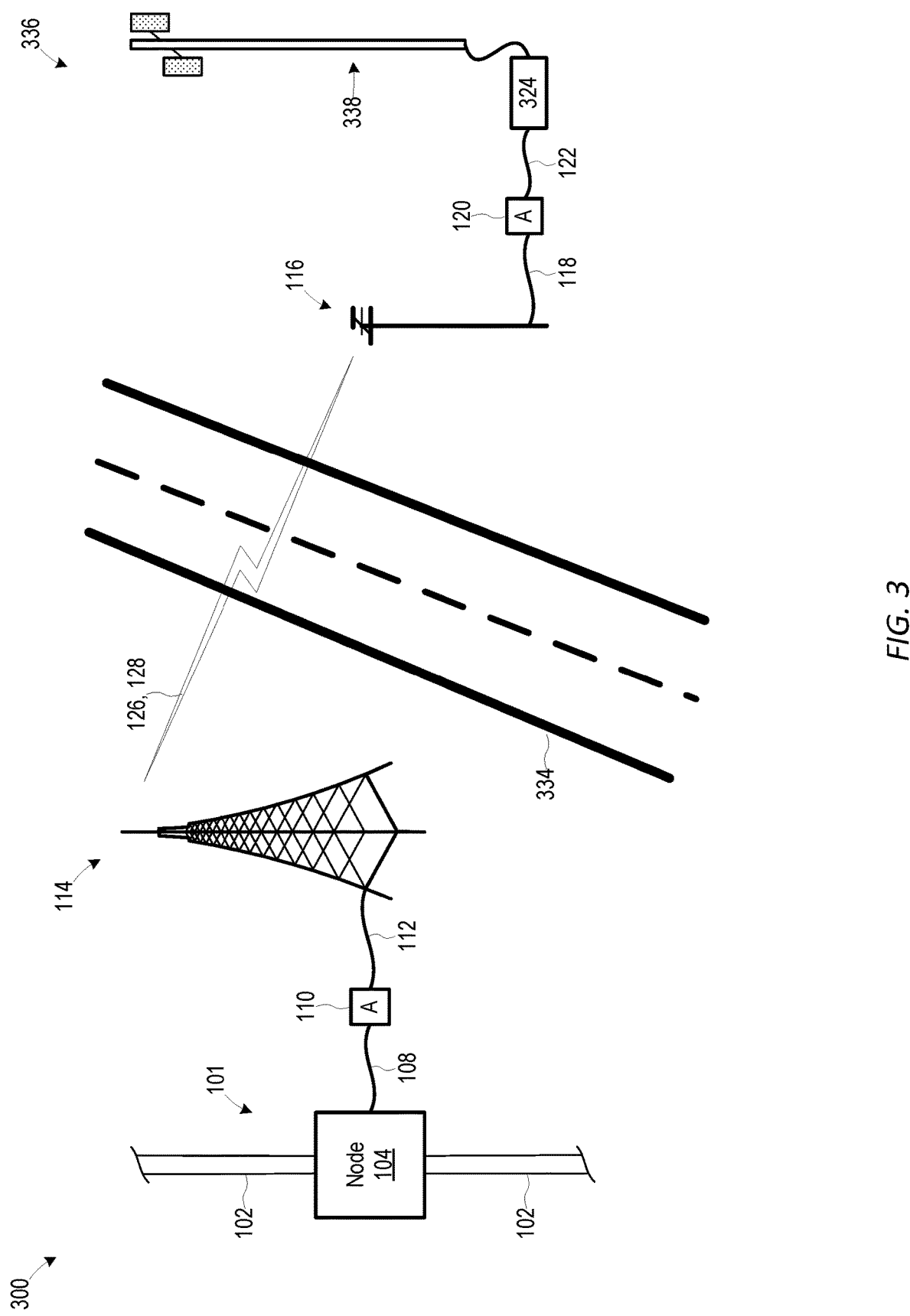
FIG. 3 is a block diagram of an alternate embodiment of the FIG. 1 system which is configured to extend a wireline communication network across a road to reach a wireless antenna site.

While FIG. 1 depicts customer premises 106 as being a rural building, system 100 is not limited to use in rural areas. Additionally, customer premises 106 could be something other than a building, such as a wireless antenna site, a utility site, or another infrastructure site. For example, FIG. 3 is a block diagram of a system 300 for extending a wireline communication network, which is an alternate embodiment of system 100 of FIG. 1 that is configured to extend wireline communication network 101 across a road 334 to reach a wireless antenna site 336. Wireless antenna site 336 includes a cellular tower 338 and a wireline communication device 324. In some embodiments, cellular tower 338 is configured to operate as one or more of a LTE wireless base station, a 5G NR wireless base station, a 6G wireless base station, an unlicensed radio spectrum wireless base station (e.g. a Wi-Fi or unlicensed NR), or extensions and/or variations thereof. Wireline communication device 324, which is an embodiment of wireline communication device 124 of FIG. 1, interfaces cellular tower 338 with access cable 122. In some embodiments, wireline communication device 324 is a modem, an ONT, or an ONU.

Figure 4:
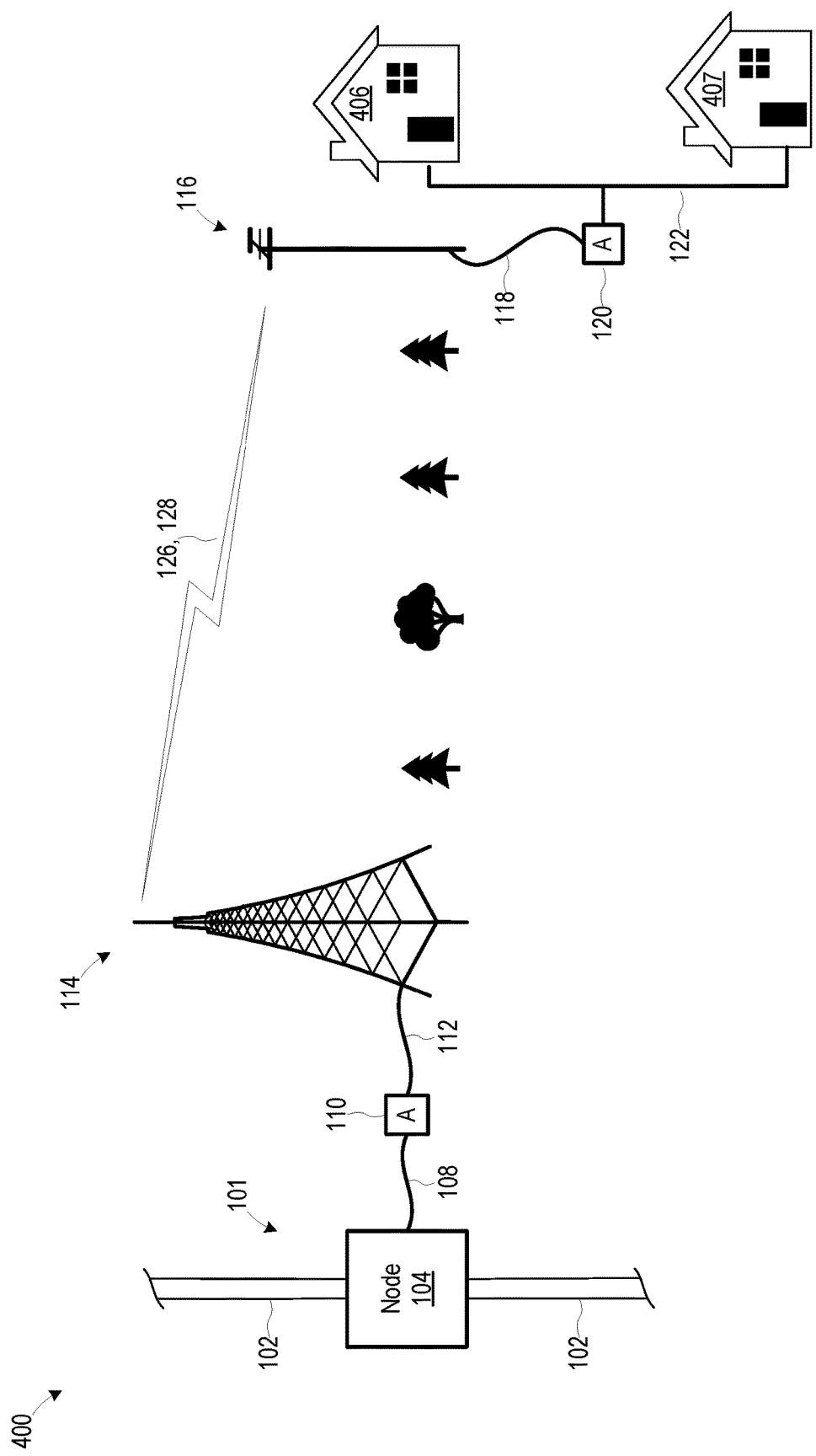
FIG. 4 is a block diagram of an alternate embodiment of the FIG. 1 system which is configured to extend a wireline communication network to two customer premises.

Additionally, a given customer antenna, such as customer antenna 116 of FIGS. 1 and 3, could be configured to support multiple customer premises. For example, FIG. 4 is a block diagram of a system 400 for extending a wireline communication network, which is an alternate embodiment of system 100 of FIG. 1 that is configured to extend wireline communication network 101 to two customer premises, i.e. to customer premises 406 and 407, using a single customer antenna 116. Antenna adapter 120 is located outside of customer premises 406 and 407, and access cable 122 communicatively couples antenna adapter 120 to a respective wireline communication device 124 (not shown in FIG. 4) in each of customer premises 406 and 407.

Discussed below with respect to FIGS. 5-10 are several example embodiments of communication node 104 and/or antenna adapter 110. It is understood, though, that communication node 104 and antenna adapter 110 are not limited to these example embodiments.

Figure 5:
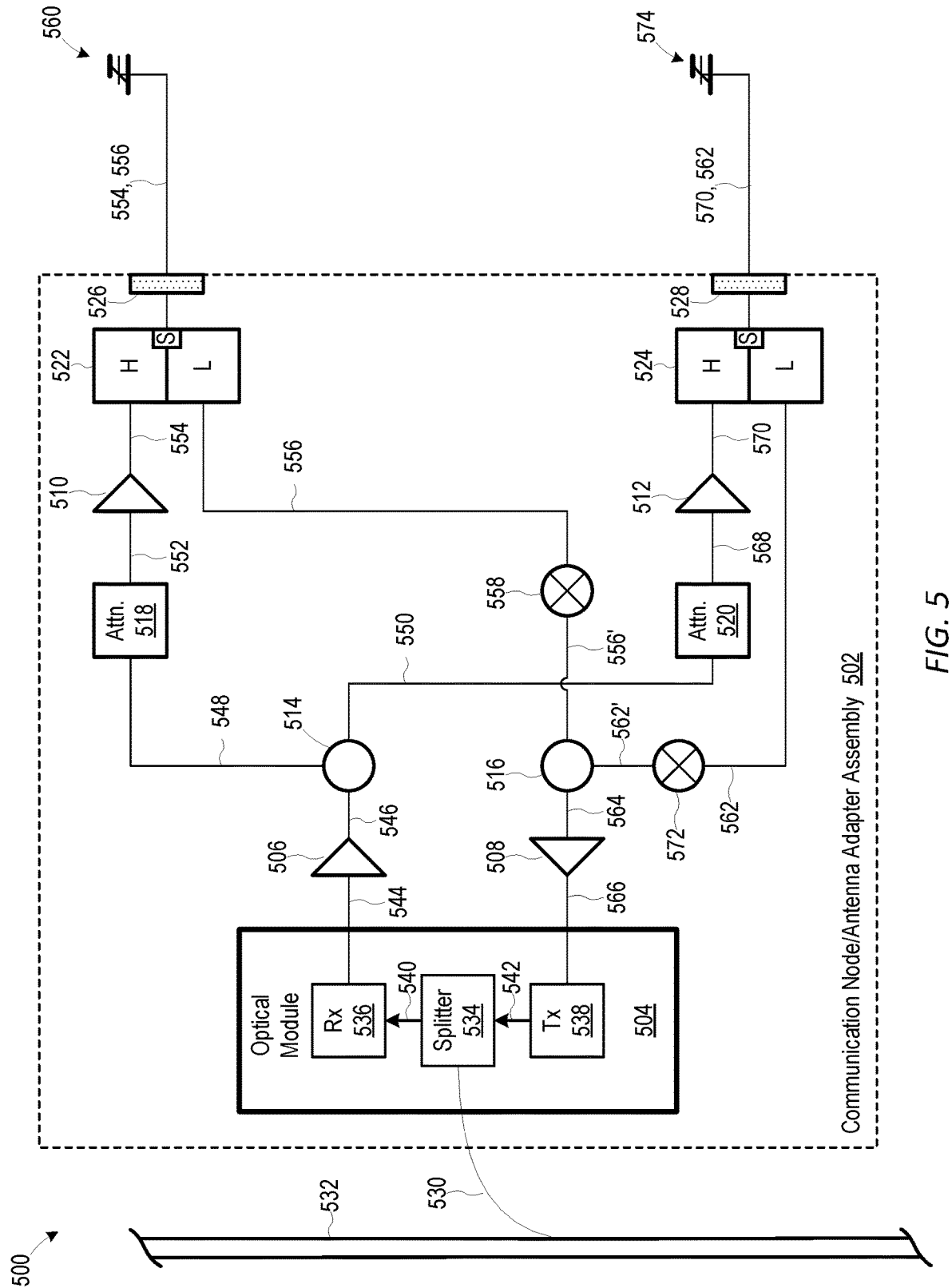
FIG. 5 is a schematic diagram of a portion of a system for extending a wireline communication network including an assembly that combines a communication node and an antenna adapter, according to an embodiment.

FIG. 5 is a schematic diagram of a portion 500 of a system for extending a wireline communication network including an assembly 502 which is a combination of a communication node and an antenna adapter. Assembly 502 is one embodiment of communication node 104 and antenna adapter 110, where communication node 104 and antenna adapter 110 are combined in a common assembly. Assembly 502 includes an optical module 504, amplifiers 506, 508, 510, and 512, couplers 514 and 516, attenuators 518 and 520, diplexers 522 and 524, and connectors 526 and 528. Assembly 502 optionally further includes frequency converters 558 and 572. Frequency converters 558 and 572 are included, for example, if frequency of uplink wireless signal 128 is outside of a range that is compatible with communication node 104.

Amplifier 506, coupler 514, attenuator 518, and amplifier 510 are communicatively coupled in series between receiver 536 and a H-port of diplexer 522. Connector 526 is communicatively coupled to a S-port of diplexer 522. Optional frequency converter 558, coupler 516, and amplifier 508 are communicatively coupled in series between a L-port of diplexer 522 and transmitter 538. Amplifier 506, coupler 514, attenuator 520, and amplifier 512 are communicatively coupled in series between receiver 536 and a H-port of diplexer 524. Connector 528 is communicatively coupled to a S-port of diplexer 524. Optional frequency converter 572, coupler 516, and amplifier 508 are communicatively coupled in series between a L-port of diplexer 524 and transmitter 538.

Assembly 502 is configured to support two wireless sectors, but assembly 502 could be modified to support only a single wireless sector or three or more wireless sectors by removing components or by replicating components as appropriate. Assembly 502 is generally discussed below in the context of a cable application, i.e. where assembly 502 is configured to operate as a cable node and comply with a cable communication protocol (e.g. a DOCSIS communication protocol). However, assembly 502 is not limited to cable applications and could instead be adapted for use with other wireline communication networks, such as by changing the characteristics of amplifiers of assembly 502.

Optical module 504 is configured to interface assembly 502 with a strand 530 of an optical cable 532. Optical cable 532 is an embodiment of wireline cable 102 (FIG. 1) including a dedicated strand, i.e. strand 530, for assembly 502. Optical module 504 includes a splitter 534, a receiver 536, and a transmitter 538. Splitter 534 is configured to split optical signals on strand 530 into a downlink optical wireline signal 540 and an uplink optical wireline signal 542. Splitter 534 delivers downlink optical wireline signal 540 to receiver 536, and splitter 534 receives uplink optical wireline signal 542 from transmitter 538.

Receiver 536 is configured to perform optical to electrical conversion by converting downlink optical wireline signal 540 to a downlink intermediate electrical signal 544. Amplifier 506 is configured to amplify downlink intermediate electrical signal 544 to generate downlink intermediate electrical signal 546. Assembly 502 is optionally designed to support specific wireless transmission frequencies for system 100, instead of a wide range of wireline transmission frequencies, which may advantageously limit required operating frequency range of assembly 502, thereby promoting low cost and simplicity of assembly 502. For example, an equalizer may not be required, and amplifiers may be narrowband amplifiers. Accordingly, in some embodiments, amplifier 506 is a narrowband amplifier, e.g. having a range from approximately 400 to 928 MHz Coupler 514 is configured to communicatively couple downlink intermediate electrical signal 546 to respective circuitry supporting each wireless sector. Specifically, coupler 514 communicatively couples signal 546 to circuitry supporting a first wireless sector as a downlink intermediate electrical signal 548, and coupler 514 communicatively couples signal 546 to circuitry supporting a second wireless sector as a downlink intermediate electrical signal 550. Attenuator 518, amplifier 510, diplexer 522, connector 526, and optional frequency converter 558 support the first wireless sector, and attenuator 520, amplifier 512, diplexer 524, connector 528, and optional frequency converter 572 support the second wireless sector. Coupler 514 could be replaced with a splitter that performs functions similar to coupler 514.

Attenuator 518 is configured to attenuate downlink intermediate electrical signal 548 to generate a downlink intermediate electrical signal 552 that is optimized for amplifier 510. Amplifier 510 is configured to amplify downlink intermediate electrical signal 552 to generate a downlink RF electrical signal 554, which is an embodiment of RF electrical signal 206 of FIG. 2. Diplexer 522 is configured to multiplex downlink RF electrical signal 554 at its H-port with an uplink RF electrical signal 556 (discussed below) at its S-port. In some embodiments, uplink and downlink frequencies handled by assembly 502 are far apart so that diplexer 522 need not have sharp roll-off characteristics. For example, in particular embodiments, downlink frequencies may be in the range of 400 to 928 MHz, and uplink frequencies may in the range of 40 to 200 MHz. Accordingly, in certain embodiments, diplexer 522 may be a simple and low-cost diplexer, which promotes low cost of assembly 502. Connector 526 is configured to communicatively couple assembly 502 with a service provider antenna 560, where antenna 560 is an embodiment of service provider antenna 114 of FIG. 1. Service provider antenna 560 is optionally a log-periodic Yagi antenna. Connector 526 is, for example, a 50 ohm or 75 ohm connector, and in particular embodiments, connector 526 is a SubMiniature version A (SMA) connector or a F-type connector. Service provider antenna 560 converts downlink RF electrical signal 554 to downlink wireless signal 126 of FIGS. 1 and 2.

Assembly 502 processes an uplink signal from the first wireless sector as follows. Service provider antenna 560 converts uplink wireless signal 128 of FIGS. 1 and 2 to uplink RF electrical signal 556, which is an embodiment of uplink RF electrical signal 216 of FIG. 2. Diplexer 522 de-multiplexes uplink RF electrical signal 556 at its S-port to provide uplink RF electrical signal 556 at its L-port. Optional frequency converter 558, if present, is configured to shift frequency of uplink RF electrical signal 556, e.g. lower frequency of uplink RF electrical signal 556, to generate an uplink RF electrical signal 556'. Coupler 516 communicatively couples uplink RF electrical signal 556 (or uplink RF electrical signal 556') and an uplink RF electrical signal 562 (or an uplink RF electrical signal 562') (discussed below) to generate an uplink RF electrical signal 564. Coupler 516 could be replaced with a splitter performing similar functions to coupler 516. Amplifier 508 is configured to amplify uplink RF electrical signal 564 to generate an uplink intermediate electrical signal 566. In some embodiments, amplifier 508 is a narrowband amplifier, e.g. having a range from approximately 40 to 200 MHz. Amplifier 508 optionally has automatic gain control to help ensure that uplink intermediate electrical signal 566 has a magnitude that is compatible with transmitter 538 of optical module 504. Transmitter 538 is configured to convert uplink intermediate electrical signal 566 to uplink optical wireline signals 542, for receipt by splitter 534 and injection onto strand 530 of optical cable 532.

The circuitry supporting the second wireless sector, i.e. attenuator 520, amplifier 512, diplexer 524, connector 528, and optional frequency converter 572 operates in the same manner as the circuitry supporting the first wireless sector. Specifically, attenuator 520 is configured to attenuate downlink intermediate electrical signal 550 to generate downlink intermediate electrical signal 568 that is optimized for amplifier 512. Amplifier 512 is configured to amplify downlink intermediate electrical signal 568 to generate downlink RF electrical signal 570, which is an embodiment of downlink RF electrical signal 206 of FIG. 2. Diplexer 524 is configured to multiplex downlink RF electrical signal 570 at its H-port with an uplink RF electrical signal 562 at its S-port. In some embodiments, diplexer 524 is a simple and low-cost diplexer for the reasons discussed above with respect to diplexer 522. Connector 528 is configured to communicatively couple assembly 502 with a service provider antenna 574, which is an embodiment of service provider antenna 114 of FIG. 1 and has the same configuration as service provider antenna 560. Connector 528 also has the same configuration as connector 526. Service provider antenna 574 converts downlink RF electrical signal 570 to downlink wireless signal 126 of FIGS. 1 and 2.

Assembly 502 processes an uplink signal from the second wireless sector as follows. Service provider antenna 574 converts uplink wireless signal 128 of FIGS. 1 and 2 to uplink RF electrical signal 562, which is an embodiment of uplink RF electrical signal 216 of FIG. 2. Diplexer 524 de-multiplexes uplink RF electrical signal 562 at its S-port to provide uplink RF electrical signal 562 at its L-port. Optional frequency converter 572, if present, shifts frequency of uplink RF electrical signal 562, e.g. lowers frequency of uplink RF electrical signal 562, to generate uplink RF electrical signal 562'. Coupler 516 communicatively couples uplink RF electrical signals 556 and 562 (or uplink RF electrical signals 556' and 562') as discussed above. Uplink signals from the second wireless sector are handled by amplifier 508, transmitter 538, and splitter 534 in the manner discussed above with respect to uplink signals from the first wireless sector.

Assembly 502 could be modified to include frequency converters analogous to frequency converters 558 and 572 in downlink signal paths, if frequency needs to be shifted before transmission by service providers antennas 560 and 574. For example, a frequency converter could be coupled be located between coupler 514 and the H-port of diplexer 522, as well as between coupler 514 and the H-port of diplexer 524.

Figure 6:
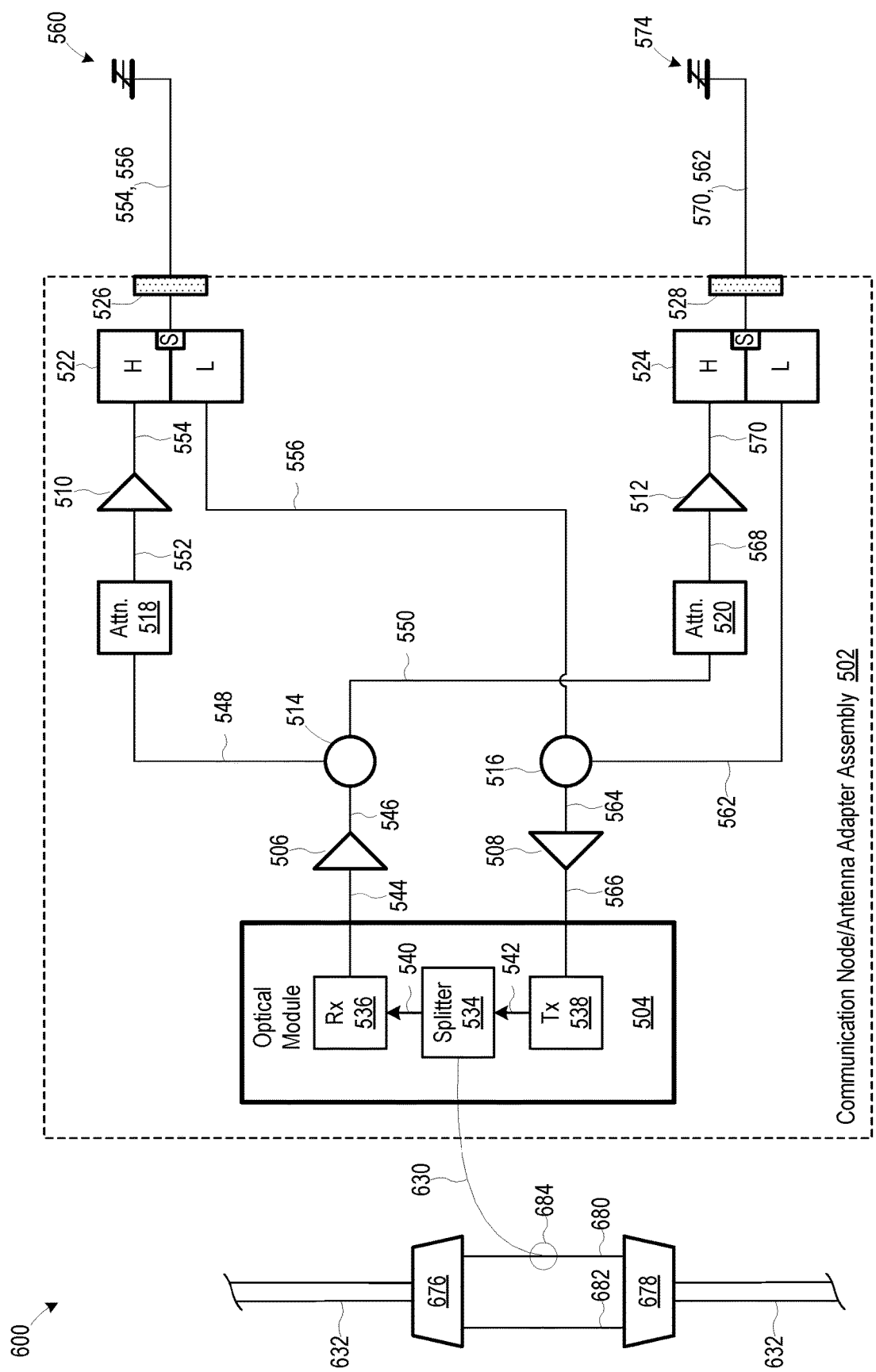
FIG. 6 is a schematic diagram of a system portion like that of FIG. 5 but where the assembly that combines the communication node and the antenna adapter is served by a shared optical cable, according to an embodiment.

Assembly 502 does not require a dedicated optical cable strand for operation. For example, FIG. 6 is a schematic diagram of a portion 600 of a system for extending a wireline communication network where assembly 502 is served by an optical cable 632 which is shared by one or more additional devices (not shown). Optical cable 632 is an embodiment of wireline cable 102 of FIG. 1. System portion 600 further includes wavelength multiplexer 676 and a wavelength demultiplexer 678. Wavelength demultiplexer 678 separates multiple wavelengths on common optical cable 632 onto different respective optical cable strands 680 and 682. Strand 680 carries a wavelength dedicated to assembly 502, and an optical coupler 684 interfaces strand 680 to a strand 630 which is communicatively coupled to splitter 534. Strand 682 symbolically represents one or more parallel strands which pass from wavelength demultiplexer 678 to wavelength multiplexer 676 without being coupled to splitter 534. Wavelength multiplexer 676 multiplexes the respective wavelengths of strands 680 and 682 back onto common optical cable 632. Wavelength multiplexer 676 and a wavelength demultiplexer 678 could be replaced with respective wavelength selective switches that are capable of achieving similar functionality to wavelength multiplexer 676 and wavelength demultiplexer 678. Optional frequency converters 558 and 572 are not shown in FIG. 6, but they could be present as indicated in FIG. 5.

Figure 7:
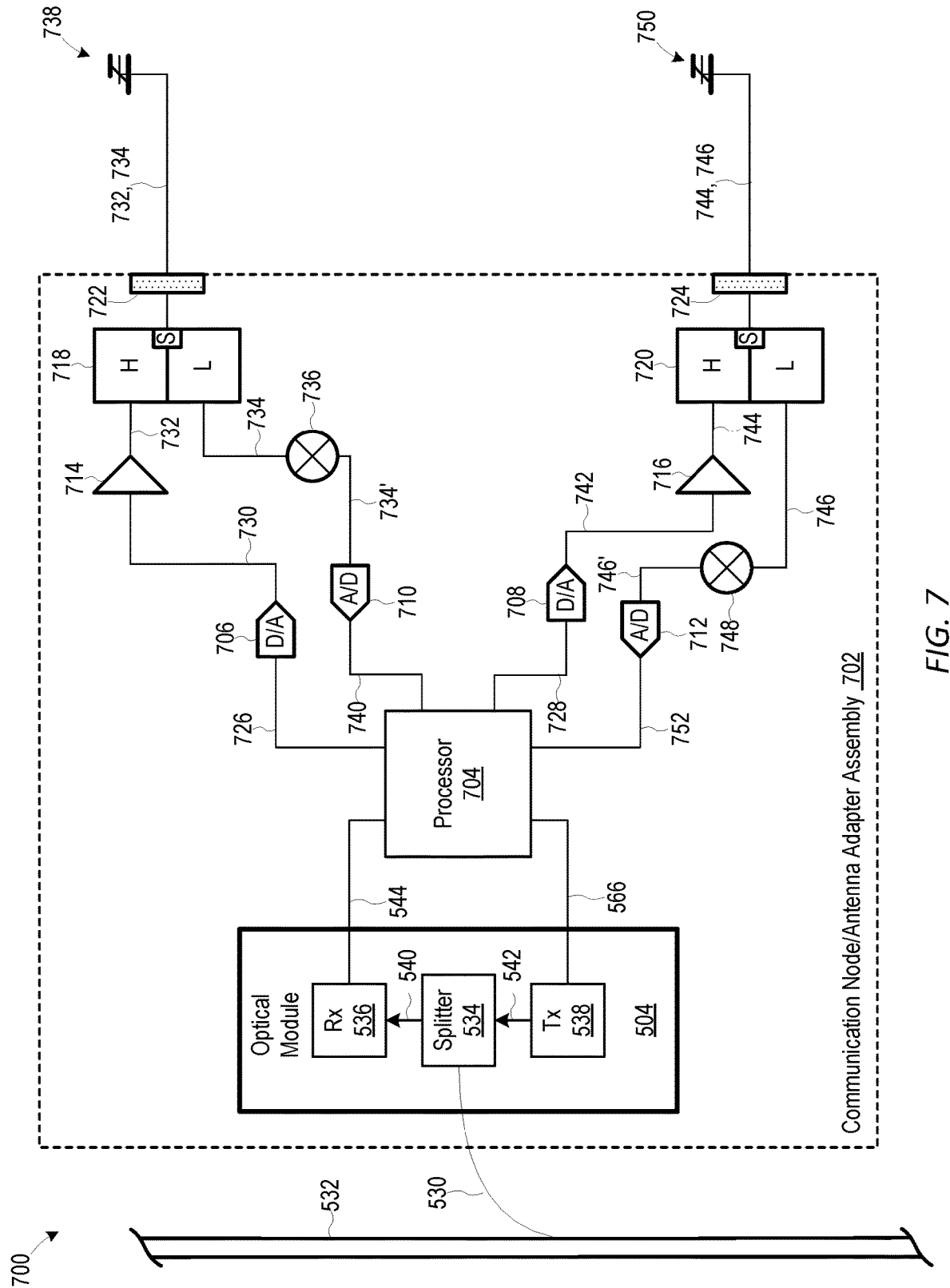
FIG. 7 is a schematic diagram of a portion of another system for extending a wireline communication network including an assembly that combines a communication node and an antenna adapter, according to an embodiment.

FIG. 7 is a schematic diagram of a portion 700 of a system for extending a wireline communication network including an assembly 702 which is a combination of a communication node and an antenna adapter. Assembly 702 is another embodiment of communication node 104 and antenna adapter 110, where communication node 104 and antenna adapter 110 are combined in a common assembly. Assembly 702 includes an optical module 504, a processor 704, digital-to-analog converters 706 and 708, analog-to-digital converters 710 and 712, amplifiers 714 and 716, diplexers 718 and 720, and connectors 722 and 724. Assembly 702 optionally further includes frequency converters 736 and 748. Frequency converters 736 and 748 are included, for example, if frequency of uplink wireless signal 128 is outside of a range that is compatible with communication node 104.

Processor 704 is communicatively coupled to each of receiver 536 and transmitter 538. Digital-to-analog converter 706 and amplifier 714 are communicatively coupled in series between processor 704 and a H-port of diplexer 718. Analog-to-digital converter 710 and optional frequency converter 736 are communicatively coupled in series between processor 704 and a L-port of diplexer 718. Connector 722 is communicatively coupled to a S-port of diplexer 718. Digital-to-analog converter 708 and amplifier 716 are communicatively coupled in series between processor 704 and a H-port of diplexer 720. Analog-to-digital converter 712 and optional frequency converter 748 are communicatively coupled in series between processor 704 and a L-port of diplexer 720. Connector 724 is communicatively coupled to a S-port of diplexer 720.

Assembly 702 is configured to support two wireless sectors, but assembly 702 could be modified to support only a single wireless sector or three or more wireless sectors by removing components or by replicating components as appropriate. Assembly 702 is generally discussed below in the context of a cable application, i.e. where assembly 702 is configured to operate as a cable node and comply with a cable communication protocol (e.g. a DOCSIS communication protocol). However, assembly 702 is not limited to cable applications and could instead be adapted for use with other wireline communication networks, such as by changing the characteristics of amplifiers 714 and 716 and/or by changing characteristics of firmware executed by processor 704.

Optical module 504 is configured to interface assembly 702 with strand 530 of optical cable 532, in the same manner as discussed above with respect to FIG. 5. Processor 704 is configured process downlink intermediate electrical signal 544 from receiver 536 to generate respective downlink intermediate electrical signals 726 and 728 for each wireless sector, where signals 726 and 728 are in digital form. For example, processor 704 is configured to direct downlink information carried by downlink intermediate electrical signal 544 to the first or second wireless sector, as appropriate, by encoding the data on either signal 726 or 728. Digital-to-analog converter 706, analog-to-digital converter 710, amplifier 714, diplexer 718, connector 722, and optional frequency converter 736 support the first wireless sector, and digital-to-analog converter 708, analog-to-digital converter 712, amplifier 716, diplexer 720, connector 724, and optional frequency converter 748 support the second wireless sector.

Referring to the first wireless sector, digital-to-analog converter 706 is configured to convert downlink intermediate electrical signal 726 from digital form to analog form to generate a downlink intermediate electrical signal 730. Amplifier 714 is configured to amplify downlink intermediate electrical signal 730 to generate a downlink RF electrical signal 732, which is an embodiment of RF electrical signal 206 of FIG. 2. Diplexer 718 is configured to multiplex downlink RF electrical signal 732 at its H-port with an uplink RF electrical signal 734 (discussed below) at its S-port. In some embodiments, uplink and downlink frequencies handled by assembly 702 are far apart so that diplexer 718 need not have sharp roll-off characteristics. For example, in particular embodiments, downlink frequencies may be in the range of 400 to 928 MHz, and uplink frequencies may in the range of 40 to 200 MHz. Accordingly, in certain embodiments, diplexer 718 may be a simple and low-cost diplexer, which promotes low cost of assembly 702. Connector 722 is configured to communicatively couple assembly 702 to a service provider antenna 738, where antenna 738 is an embodiment of service provider antenna 114 of FIG. 1. Service provider antenna 738 is optionally a log-periodic Yagi antenna. Connector 722 is, for example, a 50 ohm or 75 ohm connector, and in particular embodiments, connector 722 is a SMA connector or a F-type connector. Service provide antenna 738 converts downlink RF electrical signal 732 to downlink wireless signal 126 of FIGS. 1 and 2.

Assembly 702 processes an uplink signal from the first wireless sector as follows. Service provider antenna 738 converts uplink wireless signal 128 of FIGS. 1 and 2 to uplink RF electrical signal 734, which is an embodiment of uplink RF electrical signal 216 of FIG. 2. Diplexer 718 de-multiplexes uplink RF electrical signal 734 at its S-port and provides uplink RF electrical signal 734 at its L-port. Optional frequency converter 736, if present, is configured to shift frequency of uplink RF electrical signal 734, e.g. lower frequency of uplink RF electrical signal 734, to generate an uplink RF electrical signal 734'. Analog-to-digital converter 710 is configured to convert uplink RF electrical signal 734 (or uplink RF electrical signal 734') from analog form to digital form to generate an uplink intermediate electrical signal 740. Processor 704 is configured to generate uplink intermediate electrical signal 566 according to information represented by uplink intermediate electrical signal 740, and uplink intermediate electrical signal 566 is processed by optical module 504 as discussed above with respect to FIG. 5.

The circuitry supporting the second wireless sector, i.e. digital-to-analog converter 708, analog-to-digital converter 712, amplifier 716, diplexer 720, connector 724, and optional frequency converter 748 operates in the same manner as the circuitry supporting the first wireless sector. Specifically, digital-to-analog converter 708 is configured to convert downlink intermediate electrical signal 728 from digital form to analog form to generate a downlink intermediate electrical signal 742. Amplifier 716 is configured to amplify downlink intermediate electrical signal 742 to generate a downlink RF electrical signal 744, which is an embodiment of downlink RF electrical signal 206 of FIG. 2. Diplexer 720 is configured to multiplex downlink RF electrical signal 744 at its H-port with an uplink RF electrical signal 746 (discussed below) at its S-port. In some embodiments, diplexer 720 may be a simple and low-cost diplexer for the reasons discussed above with respect to diplexer 718. Connector 724 is configured to communicatively couple assembly 702 with a service provider antenna 750, which is an embodiment of service provider antenna 114 of FIG. 1. Service provider antenna 750 has the same configuration as service provider antenna 738, and connector 724 has the same configuration as connector 722. Service provider antenna 750 converts downlink RF electrical signal 744 to downlink wireless signal 126 of FIGS. 1 and 2.

Assembly 702 processes an uplink signal from the second wireless sector as follows. Service provider antenna 750 converts uplink wireless signal 128 of FIGS. 1 and 2 to uplink RF electrical signal 746, which is an embodiment of uplink RF electrical signal 216 of FIG. 2. Diplexer 720 de-multiplexes uplink RF electrical signal 746 at its S-port to provide uplink RF electrical signal 746 at its L-port. Optional frequency converter 748, if present, is configured to shift frequency of uplink RF electrical signal 746, e.g. lower frequency of uplink RF electrical signal 746, to generate an uplink RF electrical signal 746'. Analog-to-digital converter 712 is configured to convert uplink RF electrical signal 746 (or uplink RF electrical signal 746') from analog form to digital form to generate an uplink intermediate electrical signal 752. Processor 704 is configured to generate uplink intermediate electrical signal 566 according to information represented by uplink intermediate electrical signal 752, and uplink intermediate electrical signal 566 is processed by optical module 504 in the same manner as discussed above with respect to FIG. 5.

Assembly 702 is optionally designed to support specific wireless transmission frequencies, instead of a wide range of wireline transmission frequencies, which may advantageously limit required operating frequency range of assembly 702, thereby promoting low cost and simplicity of assembly 702. For example, equalizers may not be required due to the relatively narrow range of bandwidth supported by assembly 702. Additionally, presence of respective digital-to-analog converters 706 and 708 for each sector may eliminate the need for amplitude control because power levels can be independently controlled at the output of digital-to-analog converters 706 and 708. Each wireless sector could be configured to have the same frequency range due to each wireless sector covering a different respective area, which enables frequency reuse. Alternately, processor 704 could be configured to combine multiple sectors by replicating one signal on each of connectors 722, and 724, which may be advantageous in applications with low subscriber penetration. Although FIG. 7 illustrates assembly 702 as being supported by a dedicated optical cable strand 530, assembly 702 could alternately be supported by a shared optical cable, such as in a manner similar to that discussed above with respect to FIG. 6.

Figure 18:
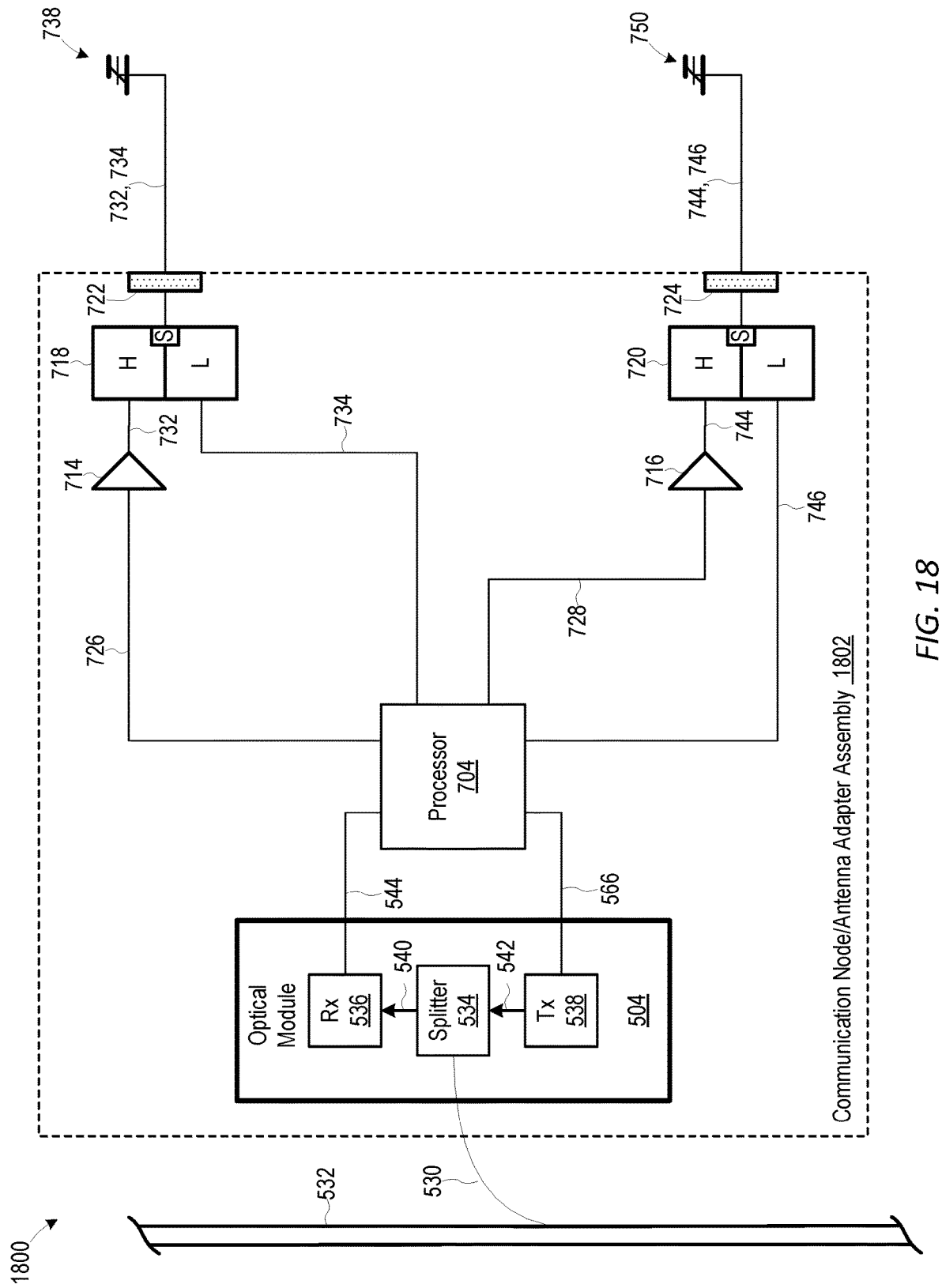
FIG. 18 is a schematic diagram of a portion of another system for extending a wireline communication network including an alternate embodiment of the FIG. 17 assembly.

Additionally, assembly 702 could be modified to include frequency converters analogous to frequency converters 736 and 748 in downlink signal paths, if frequency needs to be shifted before transmission by service providers antennas 738 and 750. For example, a frequency converter could be coupled between digital-to-analog converter 706 and the H-port of diplexer 718, as well as between digital-to-analog converter 708 and the H-port of diplexer 720. Additionally, downlink and uplink wireless signals 126 and 128 could be in digital form as well as in analog form, as discussed above. Accordingly, digital-to-analog converters 706 and 708, analog-to-digital converters 710 and 712, and optional frequency converters 736 and 748 could be omitted from assembly 702. For example, FIG. 18 is a schematic diagram of a portion 1800 of a system for extending a wireline communication network including an assembly 1802, where assembly 1802 is an alternate embodiment of assembly 702 configured for use in applications where downlink and uplink wireless signals 126 and 128 are in digital form. Assembly 1802 is like assembly 702 except that digital-to-analog converters 706 and 708, analog-to-digital converters 710 and 712, and optional frequency converters 736 and 748 are omitted. Amplifier 714 is configured to amplify downlink intermediate electrical signal 726 to generate downlink RF electrical signal 732, and amplifier 716 is configured to amplify downlink intermediate electrical signal 728 to generate downlink RF electrical signal 744. Additionally, processor 704 is configured to directly receive uplink RF electrical signals 734 and 746 from diplexers 718 and 720, respectively, in assembly 1802.

Figure 8:
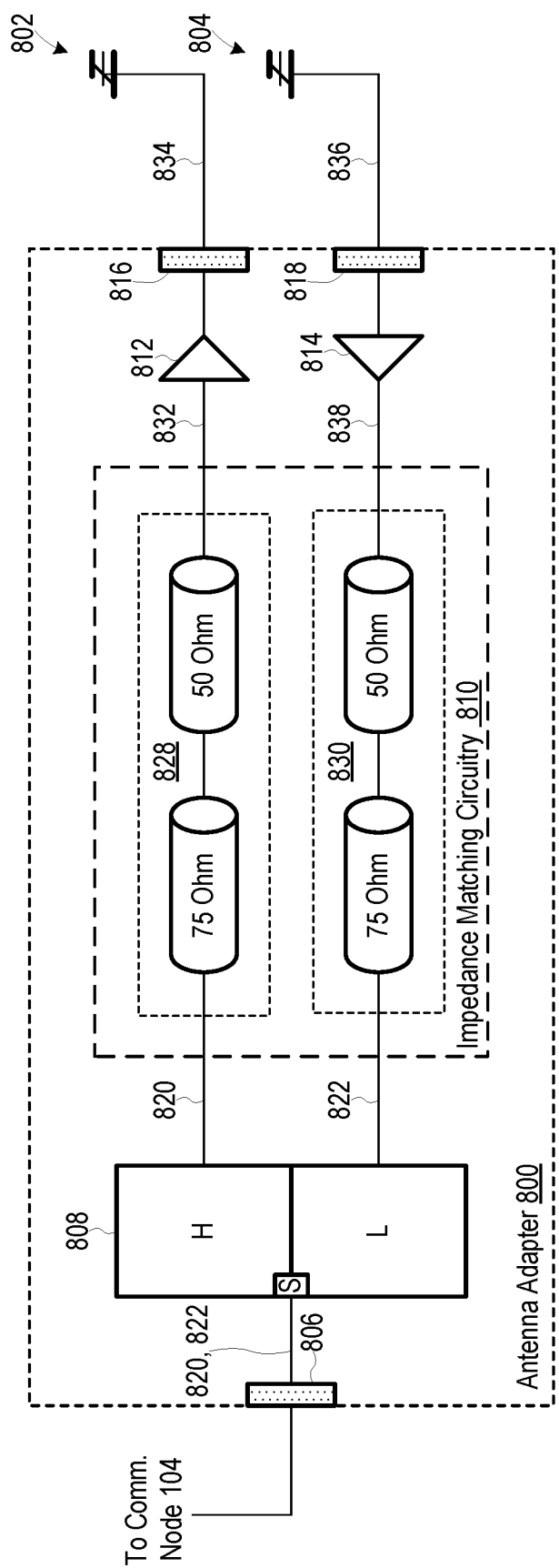
FIG. 8 is a schematic diagram of an antenna adapter that is communicatively coupled to two service provider antennas, according to an embodiment.

FIG. 8 is a schematic diagram of an antenna adapter 800 that is communicatively coupled to two service provider antennas 802 and 804. Antenna adapter 800 is an embodiment of antenna adapter 110 of FIG. 1 where service provider antenna 114 is implemented by respective downlink and uplink service provider antennas 802 and 804. Antenna adapter 800 may be used, for example, to interface a conventional embodiment of communication node 104 with two service provider antennas. Antenna adapter 800 includes a connector 806, a diplexer 808, impedance matching circuitry 810, amplifiers 812 and 814, and connectors 816 and 818. Impedance matching circuit 810 includes network 828 for downlink signals and network 830 for uplink signals.

A S-port of diplexer 808 is communicatively coupled to connector 806. Network 828 and amplifier 812 are communicatively coupled in series between a H-port of diplexer 808 and connector 816. Amplifier 814 and network 830 are communicatively coupled in series between connector 818 and a L-port of diplexer 808.

Connector 806 is configured to communicatively couple antenna adapter 800 to communication node 104, e.g. via access cable 108 of FIG. 1 (not shown in FIG. 8). In some embodiments, connector 806 is a F-type connector configured to physically connect to a coaxial electrical cable. Antenna adapter 800 is configured to receive a downlink access signal 820 from communication node 104 via connector 806, and antenna adapter 800 is configured to provide an uplink access electrical signal 822 to communication node 104 via connector 806. Downlink access electrical signal 820 and uplink access electrical signal 822 are embodiments of downlink access electrical signal 204 and uplink access electrical signal 218 of FIG. 2, respectively. Diplexer 808 is configured to de-multiplex downlink access signal 820 from uplink access signal 822 at its S-port, and diplexer 808 is configured to provide downlink access signal 820 at its H-port. Diplexer 808 is also configured to multiplex uplink access signal 822 at its L-port with downlink access signal 820 at its S-port.

Impedance matching circuitry 810 is configured to perform 75 ohms to 50 ohms impedance matching between communication node 104 and service provider antennas 802 and 804. Impedance matching circuitry 810 could be modified to perform different impedance matching without departing from the scope hereof. Additionally, impedance matching circuitry 810 could be omitted if no impedance matching is required. Network 828 is configured to transform downlink access signal 820 to a downlink intermediate electrical signal 832, and amplifier 812 is configured to amplify downlink intermediate electrical signal 832 to generate a downlink RF electrical signal 834, which is an embodiment of downlink RF electrical signal 206 of FIG. 2. In some embodiments, amplifier 812 is a narrowband amplifier, e.g. having a range from approximately 400 to 928 MHz. Connector 816 is configured to communicatively couple antenna adapter 800 to downlink service provider antenna 802, where antenna 802 is an embodiment of service provider antenna 114 of FIG. 1. Downlink RF electrical signal 834 is communicatively coupled to downlink service provider antenna 802 via connector 816. Downlink service provider antenna 802 converts downlink RF electrical signal 834 to downlink wireless signal 126 of FIGS. 1 and 2. In some embodiments, downlink service provider antenna 802 has the same configuration as service provider antenna 560 of FIG. 5. Connector 816 is configured to physically connect to an instance of antenna cable 112 of FIG. 1 (not shown in FIG. 8), and connector 816 is optionally a SMA connector.

Service provider antenna 804 is an embodiment of service provider antenna 114 of FIG. 1, and service provider antenna 804 is configured to convert uplink wireless signal 128 of FIGS. 1 and 2 to uplink RF electrical signal 836, which is an embodiment of uplink RF electrical signal 216 of FIG. 2. Connector 818 is configured to communicatively couple uplink service provider antenna 804 and antenna adapter 800, and antenna adapter 800 receives uplink RF electrical signal 836 via connector 818. Connector 818 is configured to physically connect to another instance of antenna cable 112 of FIG. 1 (not shown in FIG. 8), and connector 818 is optionally a SMA connector.

Amplifier 814 is configured to amplify uplink RF electrical signal 836 to generate an intermediate uplink electrical signal 838. In some embodiments, amplifier 814 is a narrowband amplifier, e.g. having a range from approximately 40 to 600 MHz. Amplifier 814 optionally has automatic gain control to help ensure that uplink access signal 822 has a magnitude that is compatible with communication node 104. Network 830 is configured to transform uplink intermediate electrical signal 838 to uplink access signal 822, which is provided to the L-port of diplexer 808.

It should be noted that antenna adapter 800 is not configured to perform protocol translation. Accordingly, access signals 820 and 822 comply with the same communication protocol as RF electrical signals 834 and 836. This lack of communication protocol translation promotes low cost of the antenna adapter, as well as low-latency data transmission latency by antenna adapter 800. Additionally, antenna adapter 800 does not perform frequency shifting, which further helps to achieve low cost. However, some alternate embodiments of antenna adapter 800 include frequency shifting circuitry or frequency mixing circuitry for downlink and/or uplink signals, such as for applications where wireless signals 126 and/or 128 must operate in a different frequency range than corresponding access signals at communication node 104.

Location of elements within antenna adapter 800 could be modified without departing from the scope hereof. For example, impedance matching circuitry 810 could be located between (a) amplifiers 812 and 814 and (b) connectors 816 and 818, instead of between diplexer 808 and amplifiers 812 and 814. As another example, impedance matching circuitry 810 could be modified to have a single network and be located between connector 806 and diplexer 808. Additionally, antenna adapter 800 could be modified for use with a single service provider antenna, instead of for use with respective service provider antennas for uplink and downlink.

Figure 9:
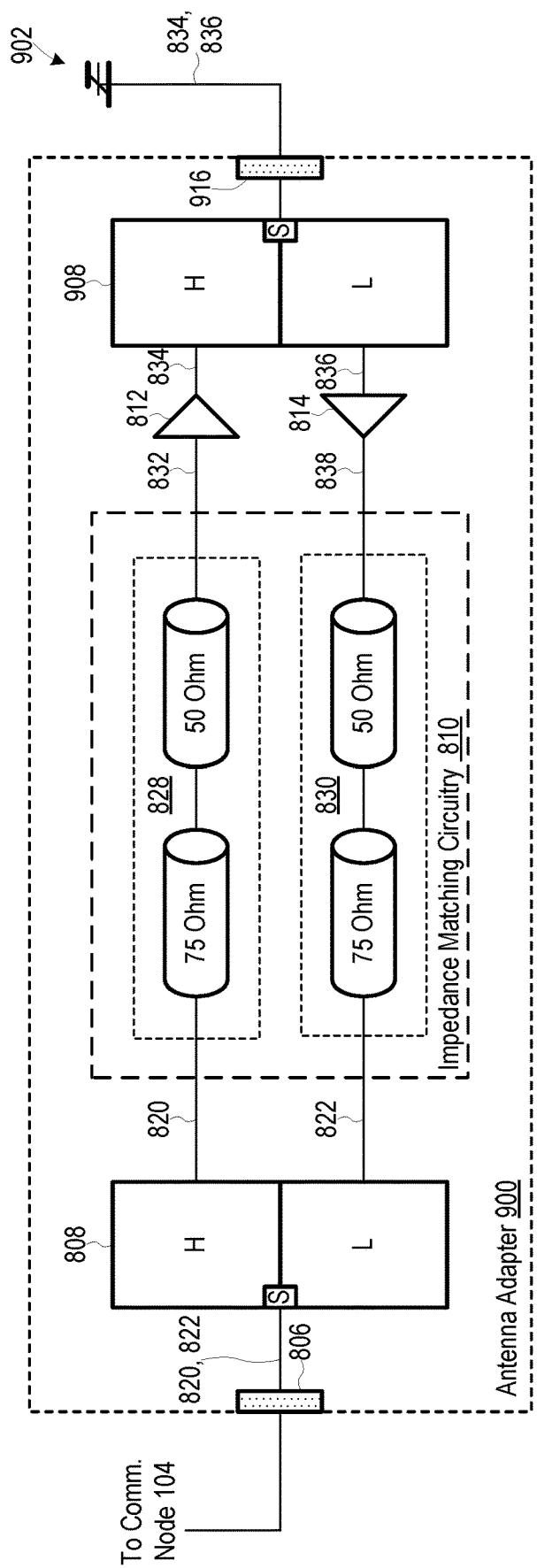
FIG. 9 is a schematic diagram of an antenna adapter that is communicatively coupled to a single service provider antenna, according to an embodiment.

For example, FIG. 9 is a schematic diagram of an antenna adapter 900 that is communicatively coupled to a single service provider antenna 902. Antenna adapter 900 is an alternate embodiment of antenna adapter 800 of FIG. 8 that intended for use with a single service provider antenna. Antenna adapter 900 is like antenna adapter 800 with the following exceptions: (a) antenna adapter 900 further includes an additional diplexer 908, (b) dual connectors 816 and 818 are replaced with a single connector 916, and (c) service provider antennas 802 and 804 are replaced with a single service provider antenna 902 for both uplink and downlink. An H-port of diplexer 908 is configured to receive downlink RF electrical signal 834 and multiplexes it at its S-port with uplink RF electrical signal 836. Diplexer 908 is also configured to de-multiplex uplink RF electrical signal 836 and downlink RF electrical signal 834 at its S-port and provide de-multiplexed RF electrical signal 836 at its L-port. Connector 916 is configured to communicatively couple antenna adapter 900 and service provider antenna 902. Service provider antenna 902, which is an embodiment of service provider antenna 114 of FIG. 1, is communicatively coupled to antenna adapter 900 via connector 916. In some embodiments, service provider antenna 902 has the same configuration as service provider antenna 560 of FIG. Connector 916 is configured to physically connect to antenna cable 112 of FIG. 1 (not shown in FIG. 9), and connector 916 is optionally a SMA connector.

Figure 10:
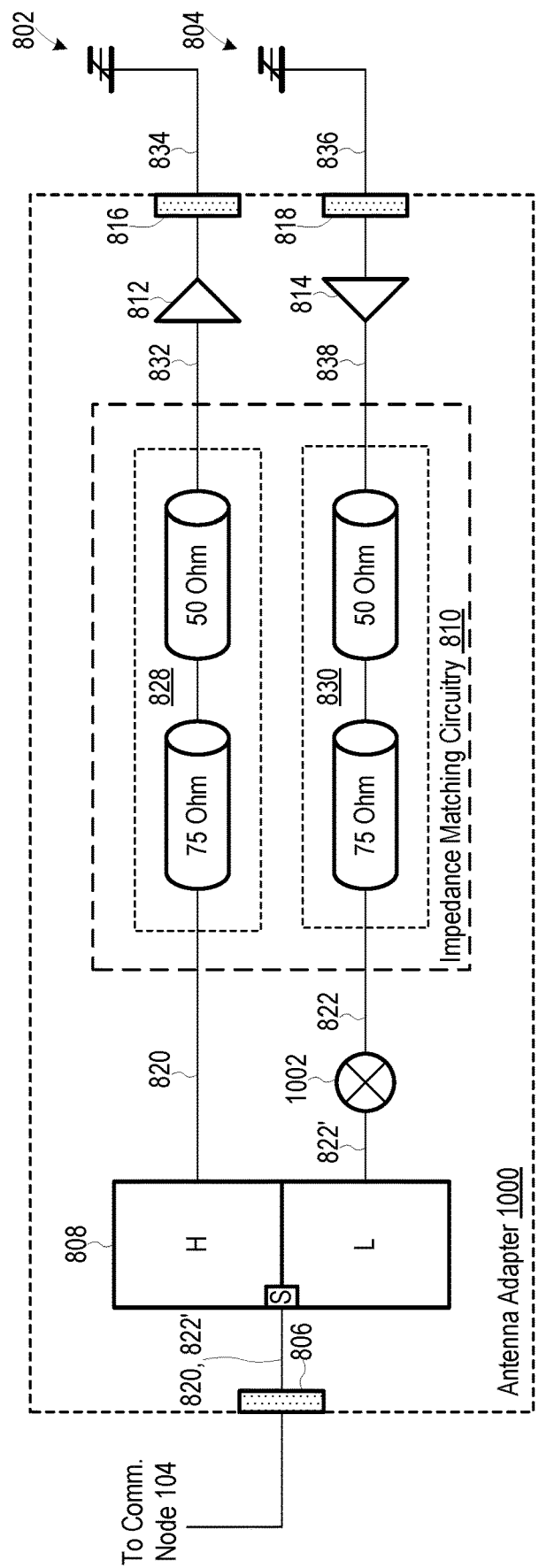
FIG. 10 is a schematic diagram of another antenna adapter that is communicatively coupled to two service provider antennas, according to an embodiment

Furthermore, either of antenna adapter 800 or 900 could be modified to additionally include a frequency converter in the downlink signal path and/or uplink signal path, as discussed above. For example, FIG. 10 is a schematic diagram of an antenna adapter 1000 that is communicatively coupled to service provider antennas 802 and 804. Antenna adapter 1000 is an alternate embodiment of antenna adapter 800 of FIG. 8 and further includes a frequency converter 1002 in the uplink data path. Specifically, frequency converter 1002 shifts frequency, e.g. decreases frequency, of uplink access signal 822 to generate uplink access signal 822'. Frequency converter 1002 is included, for example, in cases where frequency of uplink access signal 822 needs to be shifted for compatibility with communication node 104.

Discussed below with respect to FIGS. 11-15 are several example embodiments of antenna adapter 120. It is understood, though, antenna adapter 120 is not limited to these example embodiments.

Figure 11:
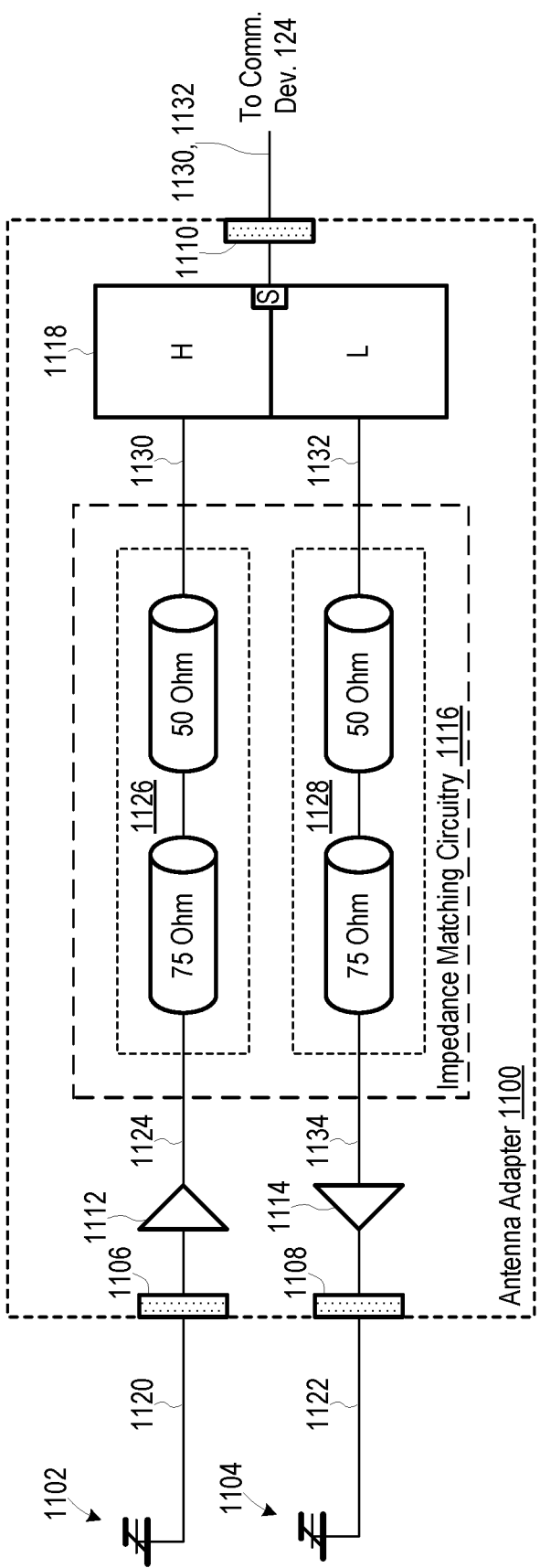
FIG. 11 is a schematic diagram of an antenna adapter that is communicatively coupled to two customer antennas, according to an embodiment.

FIG. 11 is a schematic diagram of an antenna adapter 1100 that is communicatively coupled to two customer antennas 1102 and 1104. Antenna adapter 1100 is one embodiment of antenna adapter 120 of FIG. 1 where customer antenna 116 is implemented by respective downlink and uplink customer antennas 1102 and 1104. Antenna adapter 1100 may be used, for example, to interface wireline communication device 124 with two service provider antennas. Antenna adapter 1100 includes connectors 1106, 1108, and 1110, amplifiers 1112 and 1114, and impedance matching circuitry 1116. Impedance matching circuit 1116 includes a network 1126 for downlink signals and a network 1128 for uplink signals.

Amplifier 1112 and network 1126 are communicatively coupled in series between connector 1106 and a H-port of diplexer 1118. Network 1128 and amplifier 1114 are communicatively coupled in series between a L-port of diplexer 1118 and connector 1108. A S-port of diplexer 1118 is communicatively coupled to connector 1110.

Customer downlink antenna 1102, which is an embodiment of customer antenna 116 of FIG. 1, is configured to convert downlink wireless signal 126 of FIGS. 1 and 2 to a downlink RF electrical signal 1120, which is an embodiment of downlink RF electrical signal 208 of FIG. 2. Customer uplink antenna 1104, which is an embodiment of customer antenna 116 of FIG. 1, is configured to convert an uplink RF electrical signal 1122, which is an embodiment of uplink RF electrical signal 214 of FIG. 2, to uplink wireless signal 128 of FIGS. 1 and 2. In some embodiments, each of uplink customer antennas 1102 and 1104 is capable of transmitting in a range of 5 to 800 MHz.

Connector 1106 is configured to communicatively couple antenna adapter 1100 to customer uplink antenna 1102, e.g. via an instance of antenna cable 118 (not shown in FIG. 11). Connector 1108 is configured to communicative couple antenna adapter 1100 to customer uplink antenna 1104, e.g. via another instance of antenna cable 118 (not shown in FIG. 11). Each of connectors 1106 and 1108 is, for example, a SMA connector. Amplifier 1112 is configured to convert downlink RF electrical signal 1120 to a downlink intermediate electrical signal 1124. In some embodiments, amplifier 1112 is a narrowband amplifier, e.g. having a range from approximately 400 to 928 MHz. Amplifier 1112 optionally has automatic gain control to ensure that a downlink access signal 1130 (discussed below) has a magnitude compatible with wireline communication device 124.

Impedance matching circuitry 1116 is configured to perform 75 ohms to 50 ohms impedance matching between customer antennas 1102 and 1104 wireline communication device 124. Impedance matching circuitry 1116 could be configured to perform different impedance matching without departing from the scope hereof. Additionally, impedance matching circuitry 1116 could be omitted if impedance matching is not required. Network 1126 is configured to transform downlink intermediate electrical signal 1124 to a downlink access signal 1130, which is an embodiment of downlink access signal 210 of FIG. 2. Diplexer 1118 is configured to multiplex downlink access signal 1030 at its H-port with an uplink access signal 1132 at its S-port. Diplexer 1118 is additionally configured to de-multiplex uplink access signal 1132 from downlink access signal 1130 at its S-port, to provide de-multiplexed uplink access signal 1132 at its L-port. Network 1128 is configured to transform uplink access signal 1132 to an uplink intermediate electrical signal 1134, and amplifier 1114 is configured to amplify uplink intermediate electrical signal 1134 to generate uplink RF electrical signal 1122. In some embodiments, amplifier 1114 is a narrowband amplifier, e.g. having a range from approximately 40 to 600 MHz. Wireline communication device 124 is communicatively coupled to the S-port of diplexer 1118 by connector 1110, e.g. via access cable 122 of FIG. 1 (not shown in FIG. 10). In some embodiments, connector 1110 is a F-type connector configured to physically connect to a coaxial electrical cable. It should be noted that antenna adapter 1100 is not configured to perform protocol translation. Accordingly, RF electrical signals 1120 and 1122 comply with the same communication protocol as access signal 1130 and 1132, which promotes low cost of the antenna adapter, as well as low-latency data transmission latency by antenna adapter 1100.

Figure 12:
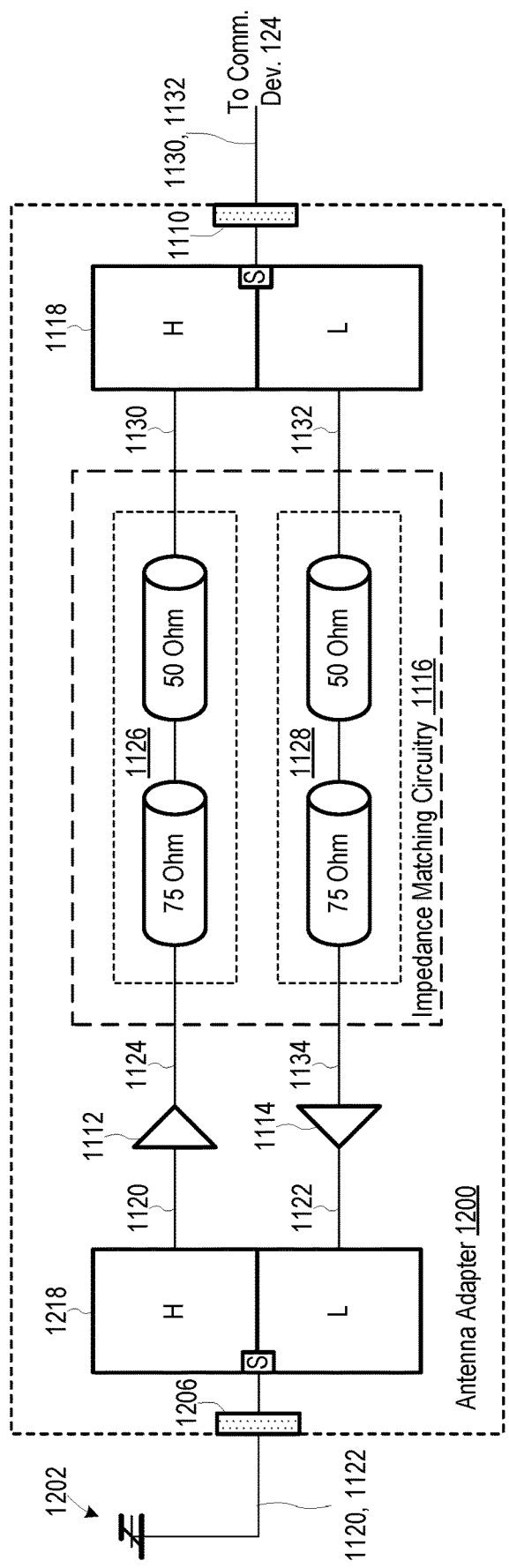
FIG. 12 is a schematic diagram of an antenna adapter that is communicatively coupled to a single customer antenna, according to an embodiment.

Antenna adapter 1100 could be modified for use with a single customer antenna, instead of for use with respective customer antennas for uplink and downlink. For example, FIG. 12 is a schematic diagram of an antenna adapter 1200 that is communicatively coupled to a single customer antenna 1202, where customer antenna 1202 is an embodiment of customer antenna 116 of FIG. 1. Antenna adapter 1200 is an alternate embodiment of antenna adapter 1100 of FIG. 11 that intended for use with a single customer antenna. Antenna adapter 1200 is like antenna adapter 1100 with the following exceptions: (a) antenna adapter 1200 further includes an additional diplexer 1218, (b) dual connectors 1106 and 1108 are replaced with a single connector 1206, and (c) customer antennas 1102 and 1104 are replaced with single customer antenna 1202 for both uplink and downlink.

A S-port of diplexer 1218 is communicatively coupled to connector 1206. Amplifier 1112 and network 1126 are communicatively coupled in series between a H-port of diplexer 1218 and the H-port of diplexer 1118. Network 1128 and amplifier 1114 are communicatively coupled in series between the L-port of diplexer 1118 and a L-port of diplexer 1218.

Amplifier 1114 is configured to provide uplink RF electrical signal 1112 to the L-port of diplexer 1218, and diplexer 1218 is configured to multiplex uplink RF electrical signal 1112 with downlink RF electrical signal 1120 at its S-port. Diplexer 1218 is also configured to de-multiplex downlink RF electrical signal 1120 from uplink RF electrical signal 1122 at its S-port, to provide de-multiplexed RF electrical signal 1120 at its H-port. Connector 1206 is configured to communicatively couple antenna adapter 1200 with customer antenna 1202, and customer antenna 1202 is accordingly communicatively coupled to connector 1206. In some embodiments, customer antenna 1202 has the same configuration as customer antennas 1102 and 1104 of FIG. 11. Customer antenna 1202 is configured to convert downlink wireless signal 126 to downlink RF electrical signal 1120, and customer antenna 1202 is configured to convert uplink RF electrical signal 1122 to uplink wireless signal 128. Connector 1206 is configured to physically connect to antenna cable 118 of FIG. 1 (not shown in FIG. 12), and connector 1206 is optionally a SMA connector.

Figure 13:
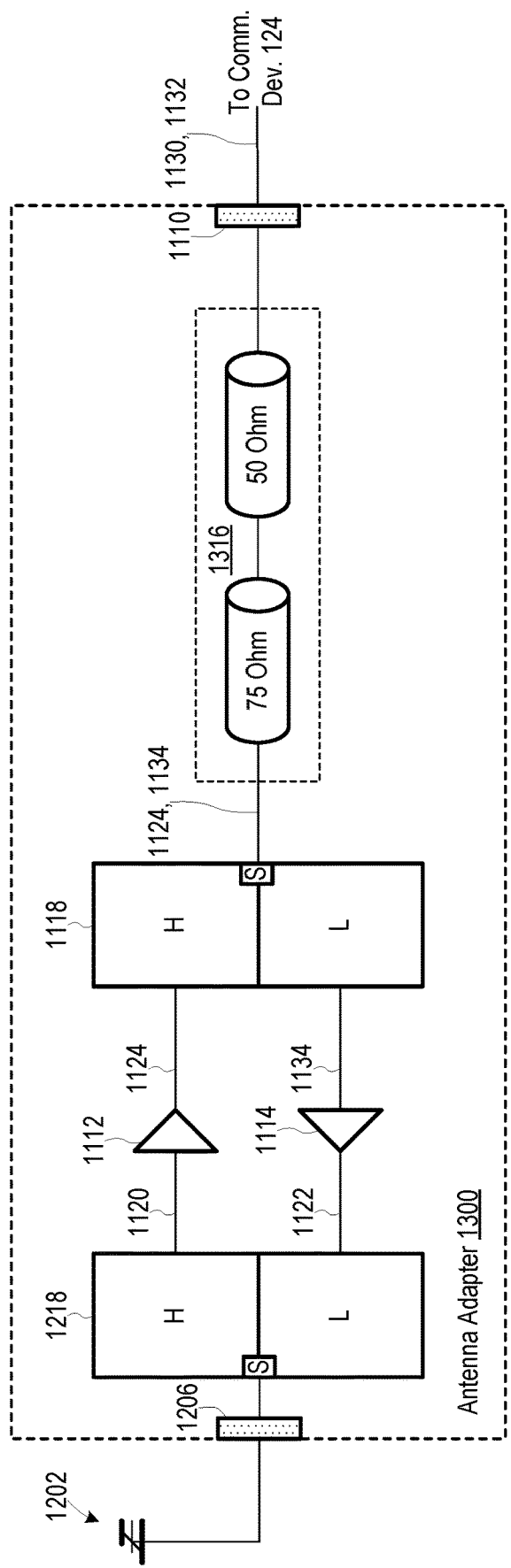
FIG. 13 is a schematic diagram of an alternative embodiment of the FIG. 12 antenna adapter that is communicatively coupled to a single customer antenna.

Locations of elements in antenna adapters 1100 and 1200 could be modified without departing from the scope hereof. For example, impedance matching circuitry 1116 could be replaced with impedance matching circuitry having only a single network and being located between diplexer 1118 and connector 1110. FIG. 13 is a block diagram of an antenna adapter 1300, which is alternate embodiment of antenna adapter 1200 which has been modified in such manner. Specifically, impedance matching circuitry 1116 has been replaced with impedance matching circuitry 1316 having a single network and connected between the S-port of diplexer 1118 and connector 1110. In this embodiment, diplexer 1118 is configured to multiplex downlink intermediate electrical signal 1124 at its H-port with uplink intermediate electrical signal 1134 at its S-port. Additionally, diplexer 1118 is configured to de-multiplex uplink intermediate electrical signal 1134 from downlink intermediate electrical signal 1124 at its S-port, to provide uplink intermediate electrical signal 1134 at its L-port.

Figure 14:
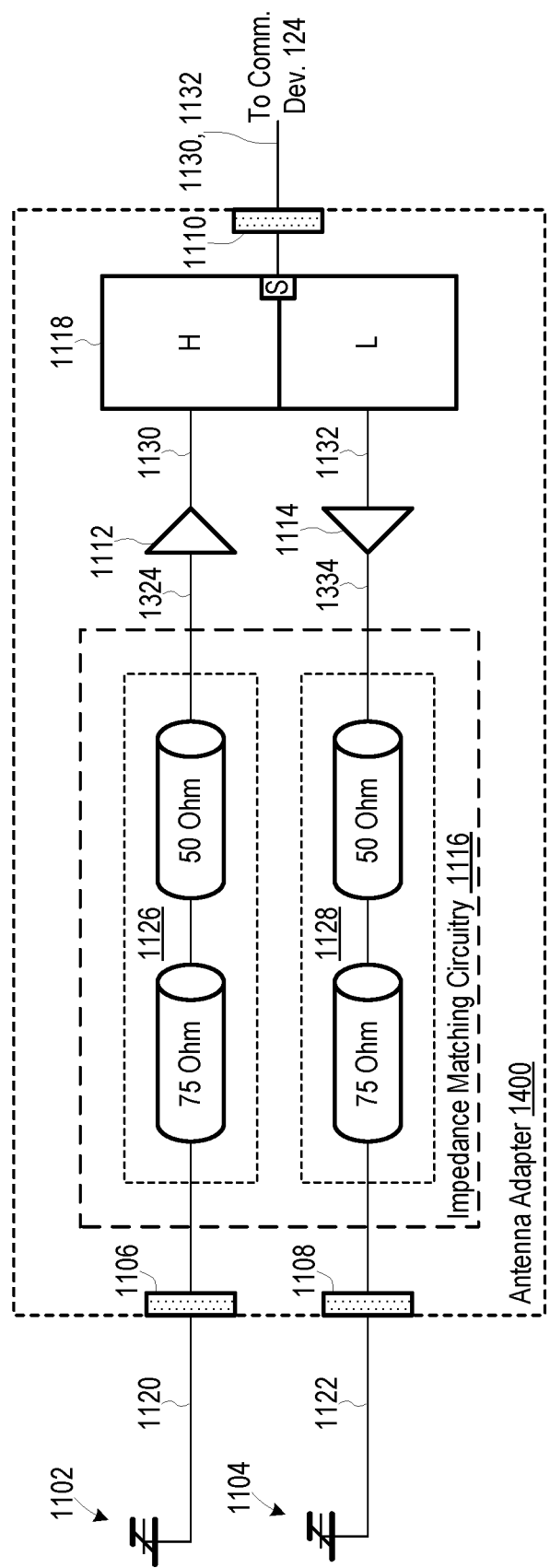
FIG. 14 is a schematic diagram of an alternate embodiment of the FIG. 11 antenna adapter that is communicatively coupled to two customer antennas.

As another example, impedance matching circuitry 1116 could be located between (a) amplifiers 1112 and 1114 and (b) connectors 1106 and 1108. FIG. 14 is a block diagram of an antenna adapter 1400, which is alternate embodiment of antenna adapter 1100 which has been modified in such manner. Specifically, network 1126 is connected between connector 1106 and amplifier 1112, and network 1128 is connected between connector 1108 and amplifier 1114. Network 1126 is configured to transform downlink RF electrical signal 1120 to a downlink intermediate electrical signal 1324, and amplifier 1112 is configured to amplify downlink intermediate electrical signal 1324 to generate downlink access signal 1130. Additionally, amplifier 1114 is configured to amplify uplink access signal 1132 to generate an uplink intermediate electrical signal 1334. Network 1128 is configured to transform uplink intermediate electrical signal 1334 to uplink RF electrical signal 1122.

Figure 15:
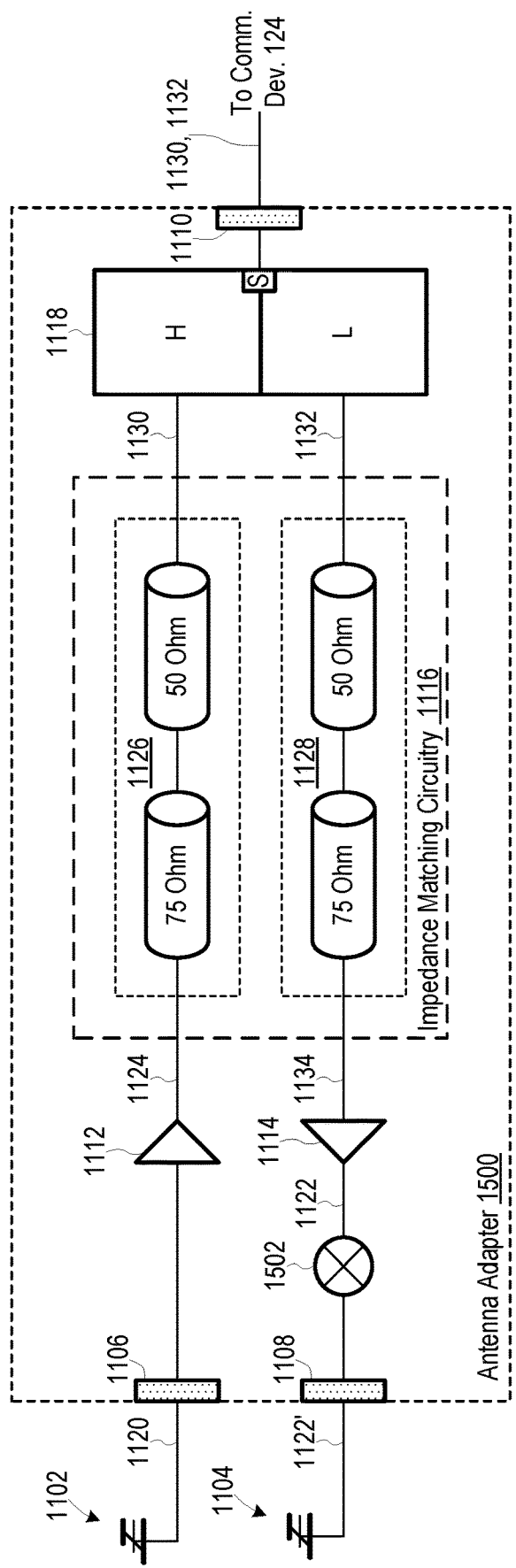
FIG. 15 is a schematic diagram of another alternate embodiment of the FIG. 11 antenna adapter that is communicatively coupled to two customer antennas.

Antenna adapters 1100, 1200, 1300, and 1400 do not perform frequency shifting, which helps achieve low cost. However, there may be applications where frequency shifting is required, such as where wireless spectrum is unavailable in the frequency range of uplink and/or downlink access signals. Accordingly, any one of antenna adapters 1100, 1200, 1300, and 1400 may be modified to include a frequency shifter in the uplink path and/or downlink path. For example, FIG. 15 is a block diagram of an antenna adapter 1500, which is alternate embodiment of antenna adapter 1100 further including a frequency converter 1502. Frequency converter 1502 is configured to shift frequency, e.g. increase frequency, of uplink RF electrical signal 1122 to generate uplink RF electrical signal 1122'. Antenna adapter 1500 optionally further includes an additional amplifier (not shown) communicatively coupled between frequency converter 1502 and connector 1108 to compensate for any degradation of uplink RF electrical signal 1122 by frequency converter 1502.

Figure 16:
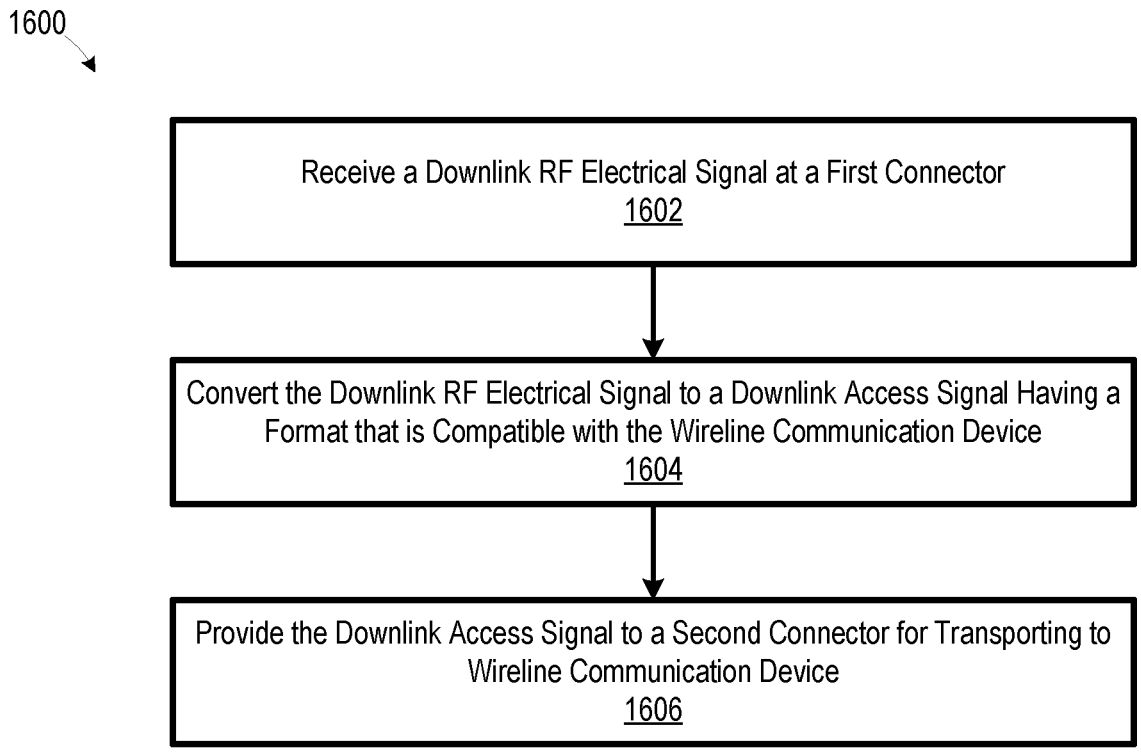
FIG. 16 is a flow chart of a method for operating a wireline communication device on a wireless communication network, according to an embodiment.

FIG. 16 is a flow chart of a method 1600 for operating a wireline communication device on a wireless communication network. In a block 1602 of method 1600, a downlink RF electrical signal is received at a first connector. In one example of block 1602, antenna adapter 120 receives downlink RF electrical signal 208 at connector 136. In a block 1604 of method 1600, the downlink RF electrical signal is converted to a downlink access signal having a format that is compatible with the wireline communication device. In one example of block 1604, antenna adapter 120 converts downlink RF electrical signal 208 to downlink access signal 210. In a block 1606 of method 1600, the downlink access signal is provided to a second connector for transporting to the wireline communication device. In one example of block 1606, antenna adapter 120 provides downlink access signal 120 to connector 134, for transporting to wireline communication device 124 via access cable 122.

Figure 17:
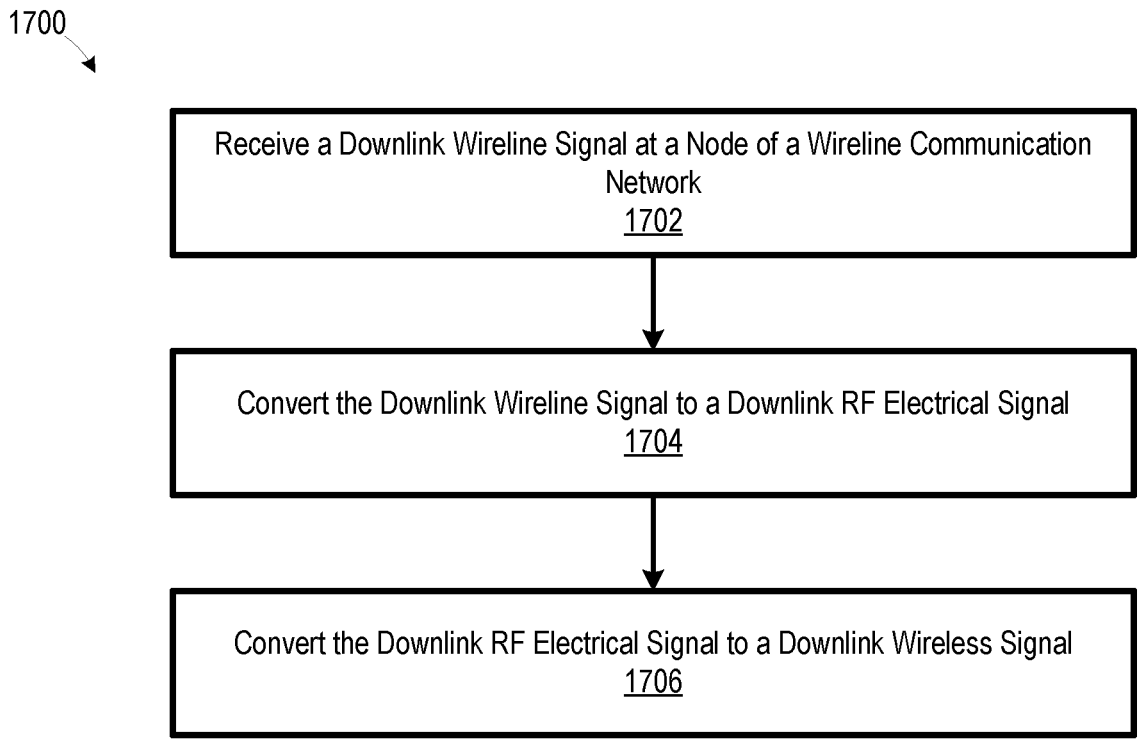
FIG. 17 is a flow chart of a method for extending a wireline communication network, according to an embodiment.

FIG. 17 is a flow chart of a method 1700 for extending a wireline communication network. In a block 1702 of method 1700, a downlink wireline signal is received at a node of the wireline communication network. In one example of block 1702, communication node 104 receives downlink wireline signal 202. In a block 1704 of method 1700, the downlink wireline signal is converted to a downlink RF electrical signal. In one example of block 1704, communication node 104 converts downlink wireline signal 202 to downlink access signal 204, and antenna adapter 110 converts downlink access signal 204 to downlink RF electrical signal 206. In a block 1706 of method 1700, the downlink RF electrical signal is converted to a downlink wireless signal, for transmission to one or more first communication devices which are not physically connected to the wireline communication network. In one example of block 1706, service provider antenna 114 converts downlink RF electrical signal 206 to downlink wireless signal 126, for transmission to wireline communication device 124.

Figure 19:
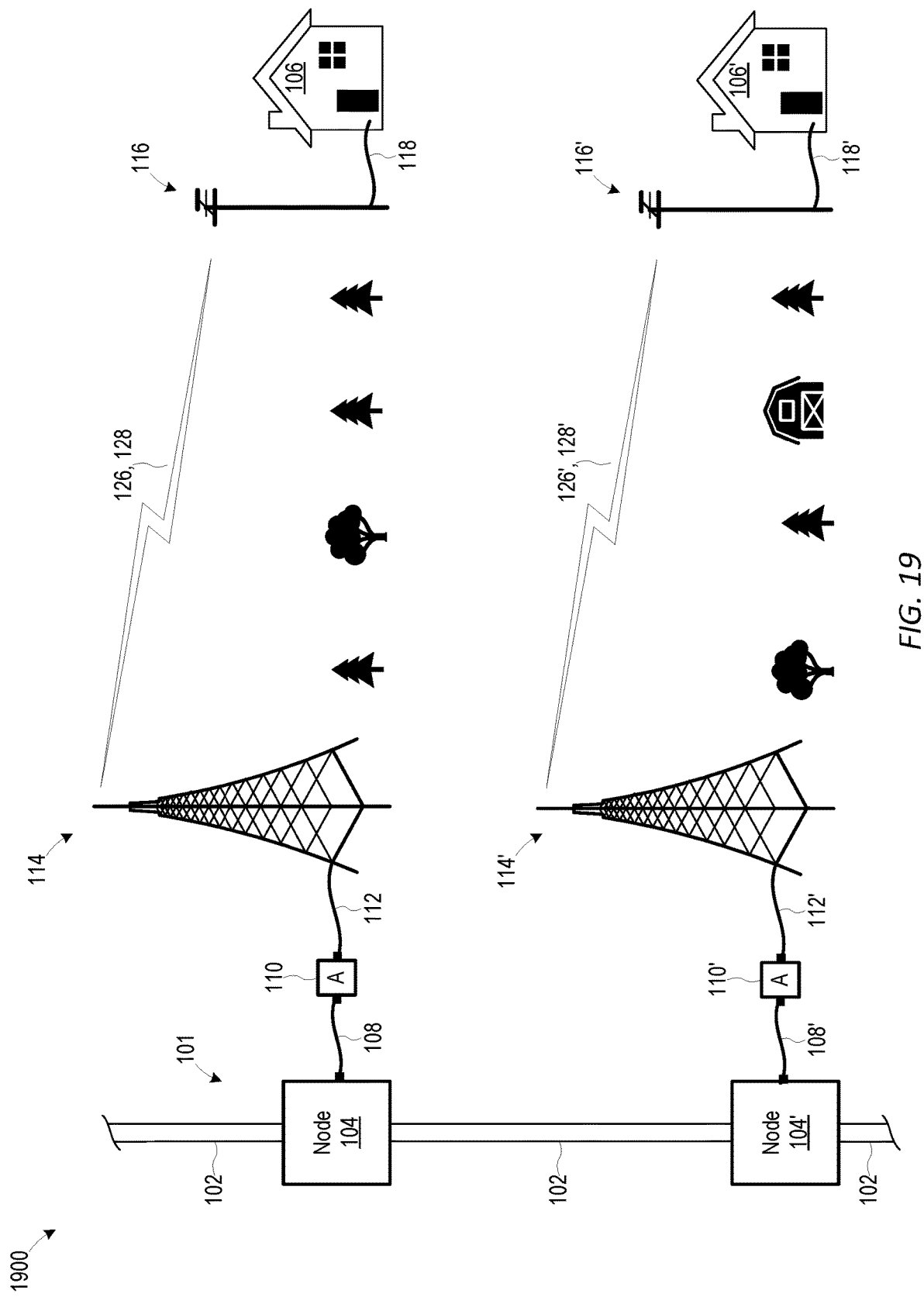
FIG. 19 is a block diagram of another alternate embodiment of the FIG. 1 system which is configured to extend a wireline communication network to two customer premises.

Referring again to FIG. 1, multiple instances of antennas 114 and 116 can use one or more common frequency bands for downlink wireless signals 126 and/or uplink wireless signals 128 if the antennas are sufficiently geographically far apart so that there is no significant interference between respective wireless signals of the antennas. For example, FIG. 19 is a block diagram of a system 1900 for extending a wireline communication network, which is an alternate embodiment of system 100 of FIG. 1 further including a communication node 104', an access cable 108' an antenna adapter 110', an antenna cable 112', a service provider antenna 114', a customer antenna 116', an antenna cable 118', and a customer premises 106'. Each prime symbol in FIG. 19 denotes an additional instance of the element associated with the corresponding reference number. For example, communication node 104' is an additional instance of communication node 104. Antennas 114 and 116 associated with communication node 104 are sufficiently geographically far apart from antennas 114' and 116' associated with communication node 104' so that there is no significant interference between (a) wireless signals 126 and 128 and (b) wireless signals 126'and 128'. Consequently, wireless signals 126' and 128' can be in the same frequency band as wireless signals 126 and 128, respectively, thereby enabling spectrum reuse among antenna sets in system 1900.

Although wireless signals 126' and 128' can be in the same frequency band as wireless signals 126 and 128, corresponding wireline signals and/or access signals may be in different respective frequency bands. For example, a downlink wireline signal on wireline cable 102 corresponding to downlink wireless signal 126 may be in a different band than a downlink wireline signal on wireline cable 102 corresponding to downlink wireless signal 126'. Accordingly, some embodiments of nodes 104 and 104', and/or antenna adapters 110 and 110', are configured to perform frequency shifting between wireline signals and RF electrical signals, to map wireline signals of different respective frequency bands to wireless signals of a common frequency band, and vice versa.

For example, consider a scenario where a downlink wireline signal intended for customer premises 106 is in a frequency band $F_1$ and a downlink wireline signal intended for customer premises 106' is in a frequency band $F_2$ that is different from frequency band $F_1$. Communication node 104 and/or antenna adapter 110 may be configured to shift frequency of the downlink wireline signal intended for customer premises 106 from frequency band $F_1$ to a frequency band $F_c$, for transmission by downlink wireless signal 126. Additionally, communication node 104' and/or antenna adapter 110' may be configured to shift frequency of the downlink wireline signal intended for customer premises 106' from frequency band $F_2$ to frequency band $F_c$, for transmission by downlink wireless signal 126'. Thus, while wireline signals for customer premises 106 and 106' are in different respective frequency bands $F_1$ and $F_2$, wireless signals for customer premises 106 and 106' are in a common frequency band $F_c$. Such reuse of spectrum (frequency band $F_c$) for downlink wireless signal transmission is possible due to significant geographic separation between antenna sets 114/116 and 114'/116', which prevents significant interference between wireless signals 126 and 126'. Similar mapping may be performed between uplink access signals in different respective frequency bands to uplink wireless signals 128 and 128' in a common frequency band.

Features described above may be combined in various ways without departing from the scope hereof. The following examples illustrate some possible combinations:

(A1) A method for operating a wireline communication device on a wireless communication network may include (1) receiving a downlink radio frequency (RF) electrical signal at a first connector, (2) converting the downlink RF electrical signal to a downlink access signal having a format that is compatible with the wireline communication device, and (3) providing the downlink access signal to a second connector for transporting to the wireline communication device.

(A2) In the method denoted as (A1), each of the downlink RF electrical signal and the downlink access signal may comply with a common communication protocol.

(A3) In the method denoted as (A2), the common communication protocol may be a cable communication protocol.

(A4) In the method denoted as (A3), the cable communication protocol may include a Data Over Cable Service Interface Specification (DOCSIS) protocol.

(A5) In the method denoted as (A2), the common communication protocol may be a digital subscriber line (DSL) protocol.

(A6) In the method denoted as (A2), the common communication protocol may be an optical data transmission protocol.

(A7) In the method denoted as (A6), converting the downlink RF electrical signal to the downlink access signal may include converting the downlink RF electrical signal to an optical signal.

(A8) In any one of the methods denoted as (A1) through (A7), converting the downlink RF electrical signal to the downlink access signal may include amplifying a downlink electrical signal.

(A9) In any one of the methods denoted as (A1) through (A8), converting the downlink RF electrical signal to the downlink access signal may include matching impedance of an antenna generating the downlink RF electrical signal and the wireline communication device.

(A10) In any one of the methods denoted as (A1) through (A9), providing the downlink access signal to the second connector may include multiplexing the downlink access signal with an uplink access signal from the wireline communication device.

(A11) Any one of methods denoted as (A1) through (A10) may further include (1) receiving an uplink access signal from the wireline communication device; (2) converting the uplink access signal to an uplink RF electrical signal having a format that is compatible with the wireline communication network; and (3) providing the uplink RF electrical signal to the first connector.

(A12) In method denoted as (A11), each of the uplink access signal and the uplink RF electrical signal may comply with a common communication protocol.

(A13) Any one of the methods denoted as (A1) through (A10) may further include (1) receiving an uplink access signal from the wireline communication device; (2) converting the uplink access signal to an uplink RF electrical signal having a format that is compatible with the wireline communication network; and (3) providing the uplink RF signal to a third connector.

(A14) In the method denoted as (A13), each of the uplink access signal and the uplink RF electrical signal may comply with a common communication protocol.

(A15) In any one of the methods denoted as (A1) through (A14), the wireline communication device may be one of a cable modem, a digital subscriber line (DSL) modem, an optical network terminal (ONT), and an optical network unit.

(B1) An antenna adapter for interfacing a wireline communication device with a wireless communication network may include (1) a first connector configured to communicatively couple the adapter to a first antenna; (2) second connector configured to communicatively couple the adapter to a second antenna; (3) a third connector configured to communicatively couple the adapter to the wireline communication device; (4) a first amplifier being communicatively coupled between the first connector and the third connector; (5) a second amplifier being communicatively coupled between the second connector and the third connector; (6) impedance matching circuitry communicatively coupled between (a) the first and second connectors and (b) the third connector; and (7) a diplexer including a H-port, a L-port, and a S-port, the H-port being communicatively coupled to the first amplifier, the L-port being communicatively coupled to the second amplifier, and the S-port being communicatively coupled to the third connector.

(B2) In the antenna adapter denoted as (B1), (1) the impedance matching circuitry may include a first network and a second network; (2) the first network may be communicatively coupled between the first amplifier and the H port of the diplexer; (3) the first amplifier may be communicatively coupled between the first connector and the first network; (4) the second network may be communicatively coupled between the second amplifier and the L-port of the diplexer; and (5) the second amplifier may be communicatively coupled between the second connector and the second network.

(B3) In the antenna adapter denoted as (B1), (1) the impedance matching circuitry may be communicatively coupled between the S-port of the diplexer and the third connector; (2) the H-port of the diplexer may be communicatively coupled to the first amplifier; and (3) the L-port of the diplexer may be communicatively coupled to the second amplifier.

(C1) An antenna adapter for interfacing a wireline communication device with a wireless communication network may include (1) a first connector configured to communicatively couple the adapter to an antenna; (2) a second connector configured to communicatively the adapter to the wireline communication device; (3) a first diplexer including a first H-port, a first L-port, and a first S-port, the first S-port being communicatively coupled to the first connector; (4) a second diplexer including a second H-port, a second L-port, and a second S-port, the second S-port being communicatively coupled to the second connector; (5) a first amplifier being communicatively coupled between the first and second H-ports; (6) a second amplifier being communicatively coupled between the first and second L-ports; and (7) impedance matching circuitry communicatively coupled between the first and second connectors.

(C2) In the antenna adapter denoted as (C1), the impedance matching circuitry may be communicatively coupled between the second S-port and the second connector.

(D1) A method for extending a wireline communication network may include (1) receiving a downlink wireline signal at a node of the wireline communication network; (2) converting the downlink wireline signal to a downlink radio frequency (RF) electrical signal; and (3) converting the downlink RF electrical signal to a downlink wireless signal, for transmission to one or more communication devices which are not physically connected to the wireline communication network.

(D2) In method denoted as (D1), each of the downlink wireline signal and the downlink RF electrical signal may comply with a common communication protocol.

(D3) In the method denoted as (D2), the common communication protocol may be a cable communication protocol.

(D4) In method denoted as (D3), the cable communication protocol may include a Data Over Cable Service Interface Specification (DOCSIS) protocol.

(D5) In the method denoted as (D2), the common communication protocol may be a digital subscriber line (DSL) protocol.

(D6) Any one of the methods denoted as (D1) through (D5) may further include (1) receiving an uplink wireless signal; (2) converting the uplink wireless signal to an uplink RF electrical signal; and (3) converting the uplink RF electrical signal to an uplink wireline signal, for transmission on the wireline communication network.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for extending a wireline communication network, the method comprising:
    receiving a first downlink wireline signal at a node of the wireline communication network;
    converting the first downlink wireline signal to a first downlink radio frequency (RF) electrical signal complying with a wireline communication protocol; and
    using an antenna, converting the first downlink RF electrical signal to a first downlink wireless signal, for transmission to one or more communication devices which are not physically connected to the wireline communication network.

2. The method of claim 1, wherein the first downlink wireline signal and the first downlink RF electrical signal comply with a cable communication protocol.

3. The method of claim 2, wherein the cable communication protocol comprises a Data Over Cable Service Interface Specification (DOCSIS) protocol.

4. The method of claim 1, wherein the first downlink wireline signal and the first downlink RF electrical signal comply with a digital subscriber line (DSL) protocol.

5. The method of claim 1, wherein the first downlink wireline signal and the first downlink RF electrical signal comply with an optical protocol.

6. The method of claim 1, wherein the first downlink wireline signal is a downlink access signal.

7. The method of claim 1, wherein the node of the wireline communication network is selected from the group consisting of a cable fiber node, an optical line terminal (OLT), and a digital subscriber line access multiplexer (DSLAM).

8. The method of claim 1, wherein converting the first downlink RF electrical signal to the first downlink wireless signal comprises converting the first downlink RF electrical signal to the first downlink wireless signal without performing communication protocol translation.

9. The method of claim 1, wherein the first downlink wireless signal is within a 3.5 GHz band.

10. The method of claim 1, wherein the first downlink wireless signal is within an industrial, scientific, and medical (ISM) band.

11. The method of claim 1, wherein the first downlink wireless signal is within a television white space (TVWS) band.

12. The method of claim 1, wherein converting the first downlink RF electrical signal to the first downlink wireless signal comprises shifting frequency of the first downlink RF electrical signal.

13. The method of claim 1, further comprising:
    receiving a second downlink wireline signal at the node of the wireline communication network;
    converting the second downlink wireline signal to a second downlink RF electrical signal; and
    converting the second downlink RF electrical signal to a second downlink wireless signal, for transmission to one or more communication devices which are not physically connected to the wireline communication network.

14. The method of claim 13, wherein:
    the first downlink wireless signal supports a first wireless sector; and
    the second downlink wireless signal supports a second wireless sector that is different from the first wireless sector.

15. The method of claim 1, further comprising:
    receiving an uplink wireless signal;
    converting the uplink wireless signal to an uplink RF electrical signal; and
    converting the uplink RF electrical signal to an uplink wireline signal, for transmission on the wireline communication network.

16. An assembly, comprising:
    a communication node configured to convert a first downlink wireline communication signal on a wireline cable to a first downlink wireline access signal;
    an antenna adapter configured to convert the first downlink wireline access signal to a first downlink radio frequency (RF) electrical signal complying with a wireline communication protocol; and
    an antenna configured to convert the first downlink RF electrical signal to a first downlink wireless signal, for transmission to one or more communication devices which are not physically connected to the wireline communication network.

17. The assembly of claim 16, wherein the wireline cable is selected from the group consisting of an optical cable and an electrical cable.

18. The assembly of claim 16, wherein the antenna adapter is further configured to convert the first downlink wireline access signal to the first RF electrical signal at least by partially by shifting a frequency of the first downlink wireline access signal from a first frequency to a second frequency.

19. The assembly of claim 18, wherein the second frequency is within a band selected from the group consisting of a 3.5 GHz band, an industrial, scientific, and medical (ISM) band, and a television white space (TVWS) band.

* * * * *